United States Patent
Haub et al.

(10) Patent No.: US 10,954,086 B1
(45) Date of Patent: *Mar. 23, 2021

(54) CONTAINER PACKER SYSTEM AND METHOD

(71) Applicant: Advanced Steel Recovery, LLC, Fontana, CA (US)

(72) Inventors: Gregory D. Haub, Douglas, OK (US); Chris D. Bartel, Fairview, OK (US)

(73) Assignee: ADVANCED STEEL RECOVERY, LLC, Fontana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/989,108

(22) Filed: Aug. 10, 2020

Related U.S. Application Data

(63) Continuation of application No. 16/055,302, filed on Aug. 6, 2018, now Pat. No. 10,737,891, which is a
(Continued)

(51) Int. Cl.
*B65G 67/20* (2006.01)
*B60P 3/00* (2006.01)

(52) U.S. Cl.
CPC ............... *B65G 67/20* (2013.01); *B60P 3/00* (2013.01); *B65G 2201/04* (2013.01); *B65G 2203/02* (2013.01); *B65G 2814/0326* (2013.01)

(58) Field of Classification Search
CPC ..................................................... B65G 67/20
(Continued)

(56) References Cited

U.S. PATENT DOCUMENTS

| | | |
|---|---|---|
| 3,040,914 A | 6/1962 | Johnson et al. |
| 3,610,139 A | 10/1971 | Bowles |

(Continued)

FOREIGN PATENT DOCUMENTS

| | | |
|---|---|---|
| DK | 4207820 | 3/1992 |
| EP | 0655403 | 5/1995 |

(Continued)

OTHER PUBLICATIONS

"2007 Award Attachments Product Range", Dec. 2007.
(Continued)

*Primary Examiner* — Jonathan Snelting
(74) *Attorney, Agent, or Firm* — Law Office of Mark Brown, LLC; Mark E Brown

(57) ABSTRACT

A container packer system includes a transfer base, which receives a container packer adapted for movement longitudinally between retracted and extended positions with respect to the transfer base. The transfer base includes a power subsystem with a motor or engine driving a hydraulic pump for powering hydraulic piston-and-cylinder units of the system, including a container packer piston-and-cylinder unit for hydraulically extending and retracting the container packer. The container packer generally encloses an interior adapted for receiving bulk material for transfer to a transport container, which can comprise a standard shipping container, a trailer or some other bulk material receptacle. The container packer includes a push blade assembly longitudinally movably mounted in its interior and actuated by a push blade piston-and-cylinder unit.

19 Claims, 27 Drawing Sheets

Related U.S. Application Data continuation of application No. 14/726,098, filed on May 29, 2015, now Pat. No. 10,059,538, which is a continuation of application No. 13/373,635, filed on Nov. 22, 2011, now Pat. No. 9,056,731, which is a continuation-in-part of application No. 12/825,435, filed on Jun. 29, 2010, now Pat. No. 8,061,950, which is a continuation of application No. 12/138,973, filed on Jun. 13, 2008, now Pat. No. 7,744,330.

(58) Field of Classification Search
USPC .................................. 414/395, 396, 400
See application file for complete search history.

(56) References Cited

U.S. PATENT DOCUMENTS

| | | |
|---|---|---|
| 3,780,893 A | 12/1973 | Lassig et al. |
| 3,815,764 A | 6/1974 | Gilfillan et al. |
| 4,077,532 A | 3/1978 | Bryan |
| 4,102,262 A | 7/1978 | Liberman et al. |
| 4,234,130 A | 11/1980 | Trott et al. |
| 4,260,317 A | 4/1981 | Martin et al. |
| 4,537,554 A | 8/1985 | Collins |
| 4,557,658 A | 12/1985 | Lutz |
| 4,653,974 A | 3/1987 | Anderson |
| 4,729,304 A | 3/1988 | Gardella et al. |
| 4,749,325 A | 6/1988 | Hodgetts |
| 5,009,560 A | 4/1991 | Ruder et al. |
| 5,015,145 A | 5/1991 | Angell et al. |
| 5,044,870 A | 9/1991 | Foster |
| 5,186,596 A | 2/1993 | Boucher et al. |
| 5,201,626 A | 4/1993 | Hansen |
| 5,374,151 A | 12/1994 | Matthews |
| 5,527,147 A | 6/1996 | Hulls |
| 5,577,873 A | 11/1996 | Tanaka |
| 6,146,078 A | 11/2000 | Hamill et al. |
| 6,312,206 B1 | 11/2001 | Pylate et al. |
| 6,418,841 B1 | 7/2002 | Little et al. |
| 6,632,066 B1 | 10/2003 | Kunio |
| 7,172,382 B2 | 2/2007 | Frankel |
| 7,210,280 B2 | 5/2007 | Cottone |
| 7,275,906 B1 | 10/2007 | Pool |
| 7,488,148 B2 | 2/2009 | Byrne |
| 7,588,406 B2 | 9/2009 | Frankel |
| 7,695,235 B1 | 4/2010 | Rallis |
| 7,744,330 B2 | 6/2010 | Haub et al. |
| 7,744,332 B2 | 6/2010 | Martin |
| 7,837,428 B2 | 11/2010 | Adams et al. |
| 7,866,932 B1 | 1/2011 | Pool |
| 8,061,950 B2 | 11/2011 | Haub et al. |
| 9,056,731 B1 | 6/2015 | Haub et al. |
| 10,737,891 B1 * | 8/2020 | Haub .................. B60P 3/00 |
| 2002/0085904 A1 | 7/2002 | Hallstrom |
| 2006/0285949 A1 | 12/2006 | Frankel |
| 2008/0038100 A1 | 2/2008 | Frankel |

FOREIGN PATENT DOCUMENTS

| | | |
|---|---|---|
| EP | 867400 | 9/1998 |
| GB | 2222397 | 3/1990 |
| JP | 2000016152 | 1/2000 |
| WO | 8001793 | 9/1980 |
| WO | 8500347 | 1/1985 |
| WO | 03080481 | 10/2003 |
| WO | 2006/044371 | 4/2006 |

OTHER PUBLICATIONS

"Container Tilters", A-WARD Product Brochure retrieved from Internet Nov. 1, 2010 www.a-ward.com, 1-6.

"International Search Report", PCT/US2005/036512, dated Mar. 3, 2006, (Feb. 21, 2006).

Meersmans, et al., "Operations Research Supports Container Handling", Econometric Institute Report EI 2001-22, Nov. 2, 2001.

* cited by examiner

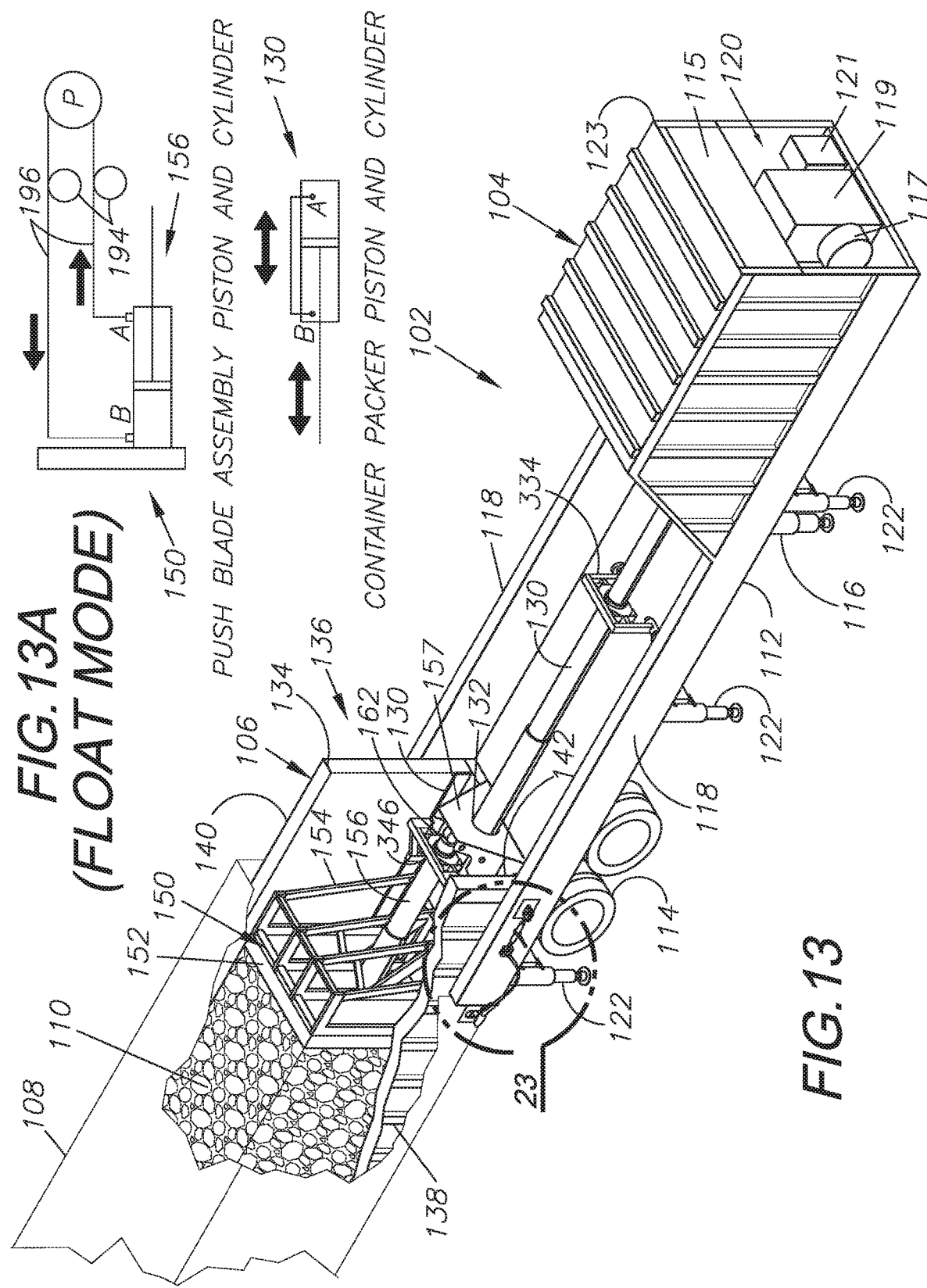

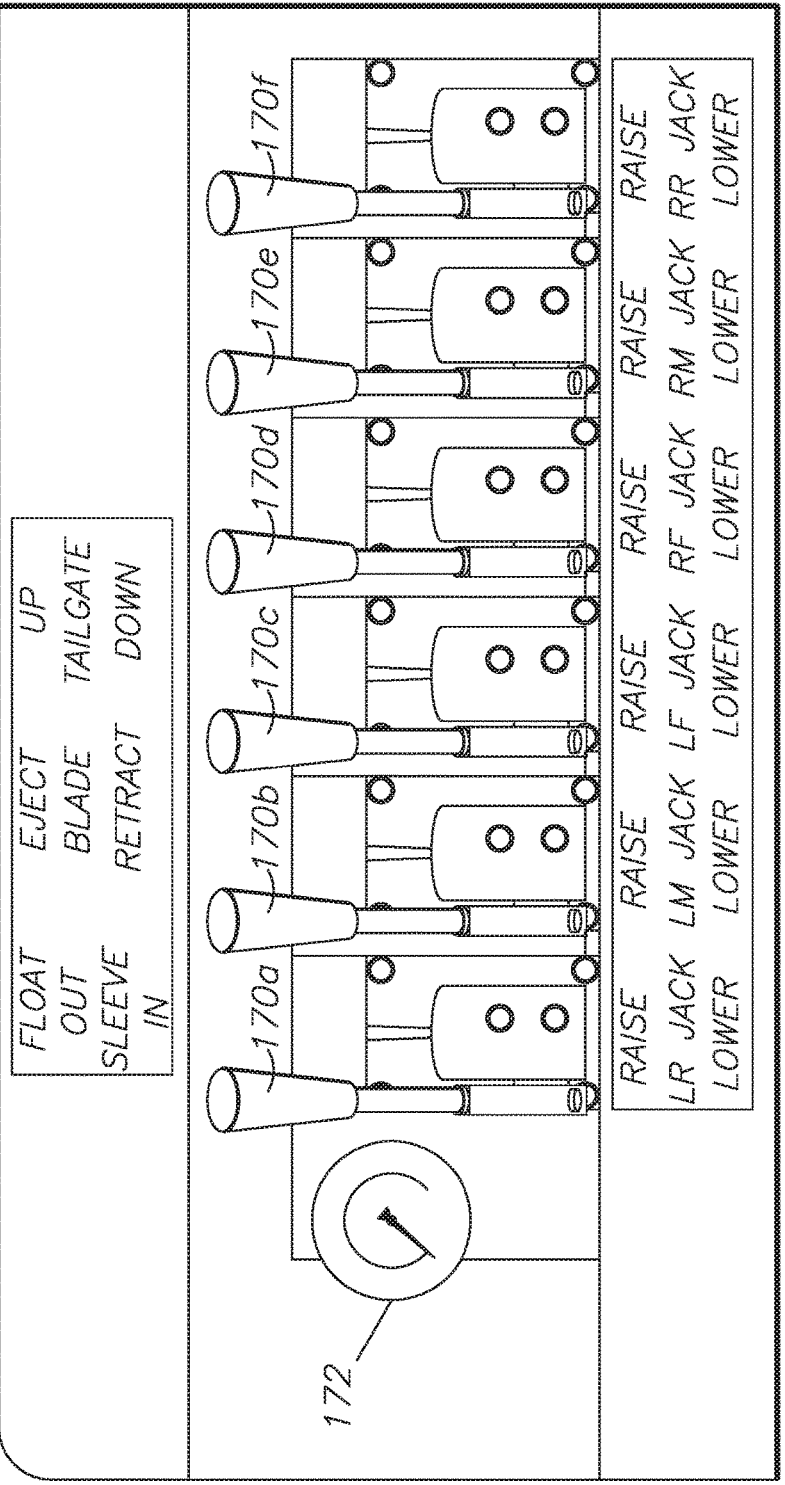

CONTAINER PACKER SYSTEM AND METHOD

CROSS-REFERENCE TO RELATED APPLICATIONS

This application is a continuation of and claims priority in U.S. patent application Ser. No. 16/055,302 filed Aug. 6, 2018, which is a continuation of and claims priority in U.S. patent application Ser. No. 14/726,098 filed May 29, 2015 now U.S. Pat. No. 10,059,538 issued Aug. 28, 2018, which is a continuation of and claims priority in U.S. patent application Ser. No. 13/373,635, filed Nov. 22, 2011, now U.S. Pat. No. 9,056,731 issued Jun. 16, 2015 which is a continuation-in-part of and claims priority in U.S. patent application Ser. No. 12/825,435, filed Jun. 29, 2010, now U.S. Pat. No. 8,061,950, issued Nov. 22, 2011, which is a continuation of and claims priority in U.S. patent application Ser. No. 12/138,973, filed Jun. 13, 2008, now U.S. Pat. No. 7,744,330, issued Jun. 29, 2010, all of which are incorporated herein by reference.

BACKGROUND OF THE INVENTION

1. Field of the Invention

The present invention relates generally to handling waste and other bulk materials, and in particular to a system and method for packing a container with bulk material for transport.

2. Description of the Related Art

Bulk materials of various types require transportation, e.g. from their sources to destinations for disposal or processing. Waste handling and other bulk material operations use a variety of transportation modes, including over-the-road trucks and marine vessels. Presently a large percentage of cargo is transported in standardized shipping containers, which are generally approximately 8'×8'×20' or 8'×8'×40' (width×height×length). Facilities are available for handling such containers, including loading and unloading to and from trailers, railcars and marine vessels. A bulk material operation would preferably utilize such standard containers and load or pack them as efficiently as possible in order to minimize the costs associated with procuring and transporting the containers and conveyance vehicles. Certain materials, such as scrap and refuse, are susceptible to compression packing in order to minimize space requirements and thereby increase efficiency.

The field of waste handling is a significant commercial activity, encompassing scrap disposal refuse hauling, materials recycling and demolition debris removal. Hazardous waste handling involves extra precautions and regulations. Improving bulk material handling and transporting equipment and procedures can significantly improve the efficiency, safety and effectiveness of waste handling operations. For example, common prior art waste handling methods involved loading large trash containers, bins and other receptacles using loaders, cranes and similar equipment.

Heretofore there has not been available a bulk material handling system or method with the advantages and features of the present invention, including a container packer for receiving the material and transferring it to a container or other vessel for transport.

SUMMARY OF THE INVENTION

In the practice of an aspect of the present invention, a container packer system is provided with a transfer base, which receives a container packer adapted for movement longitudinally between retracted and extended positions with respect to the transfer base. The transfer base includes a power subsystem with a motor or engine driving a hydraulic pump for powering hydraulic piston-and-cylinder units of the system, including a container packer piston-and-cylinder unit for hydraulically extending and retracting the container packer. The container packer generally encloses an interior adapted for receiving bulk material for transfer to a transport container, which can comprise a standard shipping container, a trailer or some other bulk material receptacle. The container packer includes a push blade assembly longitudinally movably mounted in its interior and actuated by a push blade piston-and-cylinder unit. In the practice of another aspect of the present invention, a container packer method includes the steps of loading the interior of the container packer with bulk material in its retracted position on the transfer base, locating a transport container in alignment and behind the transfer base, hydraulically inserting part of the container packer into the transport container, hydraulically emptying the container packer of bulk material into the transport container with the push blade assembly, retracting the push blade assembly within the container packer and extracting the container packer onto the transfer base.

BRIEF DESCRIPTION OF THE DRAWINGS

The drawings constitute a part of this specification and include exemplary embodiments and aspects of the present invention and illustrate various objects and features thereof.

FIG. 13 is a fragmentary, upper, front perspective view of the transfer base with the container packer and push blade assembly extended into a transport container and the container packer operating in float mode.

FIG. 13A is a cross-sectional view of push blade assembly piston-and-cylinder and container packer piston-and-cylinder when the container packer is operating in float mode.

FIG. 14 is a front elevational view of the control panel.

DETAILED DESCRIPTION OF THE PREFERRED EMBODIMENTS

I. Introduction and Environment

Figure 1:
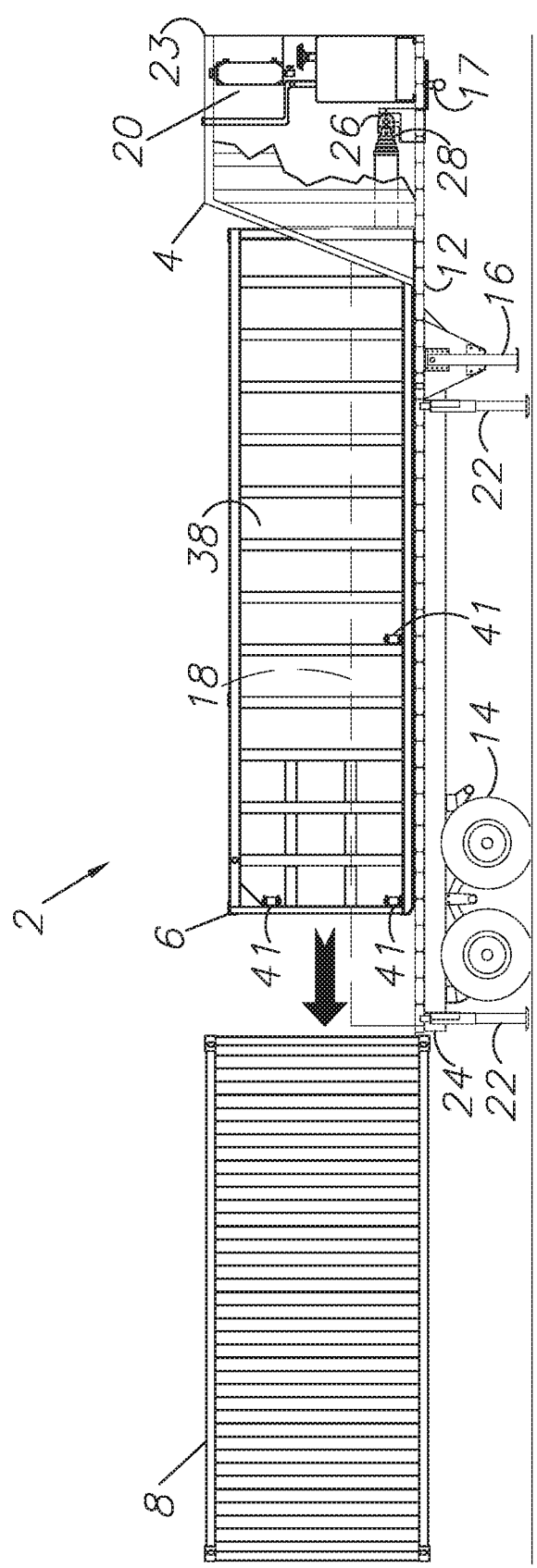
FIG. 1 is a side elevational view of a container packer system embodying an aspect of the present invention, shown with a container packer in a retracted position on a transfer base aligned with a transport container.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, base, front, back, right and left refer to the invention as oriented in the view being referred to. The words "inwardly" and "outwardly" refer to directions toward and away from, respectively, the geometric center of the embodiment being described and designated parts thereof. Forwardly and rearwardly are generally in reference to the direction of travel, if appropriate. Said terminology will include the words specifically mentioned, derivatives thereof and words of similar meaning.

Referring to the drawings in more detail, the reference numeral 2 generally designates a container packer system embodying an aspect of the present invention. The system 2 generally comprises a transfer base 4 reciprocally and slidably mounting a container packer 6. A transport container 8 receives bulk material 10 from the container packer 6.

II. Transfer Base 4

Figure 10:
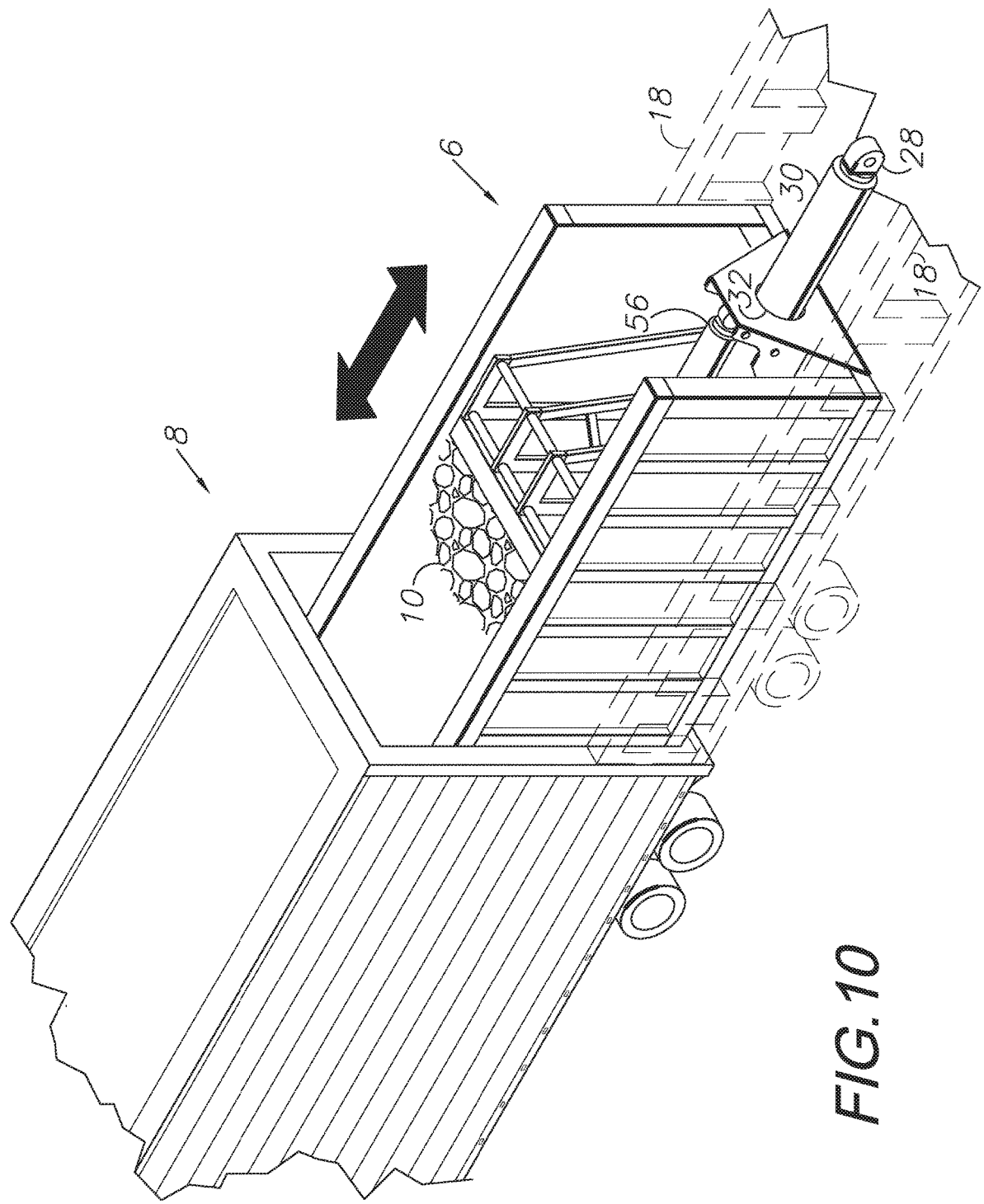
FIG. 10 is a fragmentary, upper perspective view of a container packer system comprising an aspect of the present invention, shown with the container packer extending partly into a trailer.

The transfer base 4 can comprise a vehicle, such as a trailer, as shown in FIG. 1. Alternatively, the transfer base 4 can be another type of vehicle or a permanent structure. The transfer base 4 can be generally constructed as a flatbed trailer with a bed 12 mounting a wheel truck 14, a pair of adjustable-height main jacks 16 and a king pin hitch 17 for connection to a tractor unit (not shown). A pair of sidewalls 18 is mounted on either side of the bed 12, shown more clearly in FIG. 10.

The transfer base 4 includes a power subsystem 20, which can include an internal combustion engine, a hydraulic pump, a hydraulic reservoir, a hydraulic control valve and other hydraulic components, equipment, lines and fittings as needed. Alternatively, other power sources can be utilized, such as pneumatic, electric, combination hydraulic-pneumatic-electric, etc. External power sources, e.g., electrical service, can be connected to the transfer base 4 for powering its operations. FIG. 1 demonstrates the front end 23 and back end 24 of the transfer base. When being transported, the king pin hitch 17 located near the front end 23 is connected to a standard transport tractor truck. When loading, the back end 24 is placed adjacent to a transport container 8.

A container packer drive including a front cylinder mount 26 is located in proximity to the power subsystem 20, i.e. backward on the transfer base 4, and mounts a proximate end 28 of a multi-stage insertion/extraction piston-and-cylinder unit 30, which also includes a distal end 32 connected to the container packer 6.

III. Container Packer 6

The container packer 6 includes: front and back ends 34, 36; opposite sidewalls 38, 40 mounting rollers 41 for engaging the transfer base sidewalls 18 and the transport container 8: and a floor 42 mounting rollers 43 on which the container packer 6 rolls fore-and-aft. A rolling, overhead door 44 is mounted generally in and selectively closes a back opening 35, which is formed in the back end 36 for selectively enclosing a container packer interior 46, which receives the bulk material 10. The door 44 is operated by a door piston-and-cylinder unit 48, and is mounted on rails 45 externally mounted on the back end 36 of the container packer. Externally mounting the door prevents scrap metal or other bulk material from becoming jammed against the door rail, preventing the blade 10 from progressing. Alternatively, various other types of doors and operating mechanisms can be utilized.

Figure 4:
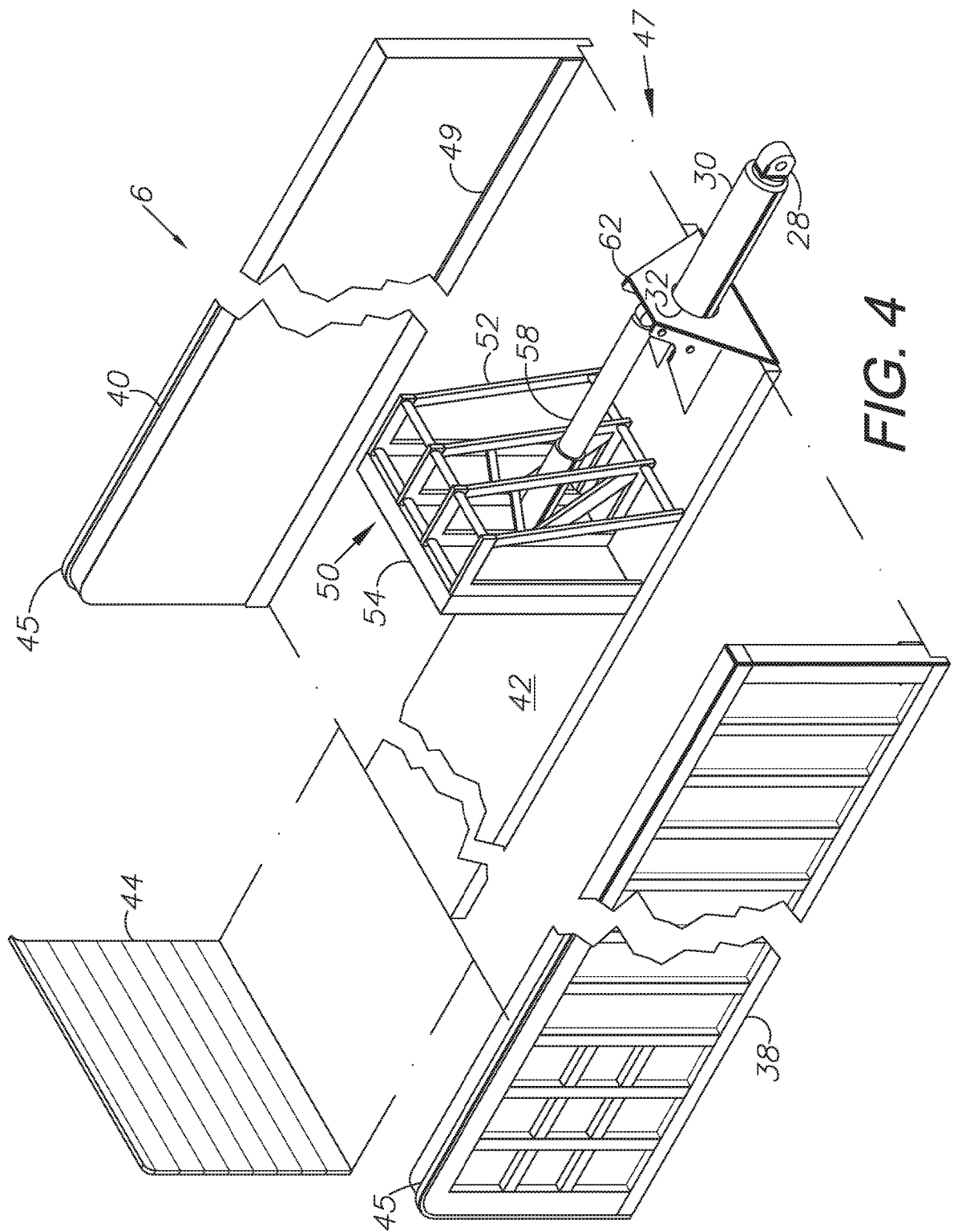
FIG. 4 is an exploded view of the container packer.
Figure 5:
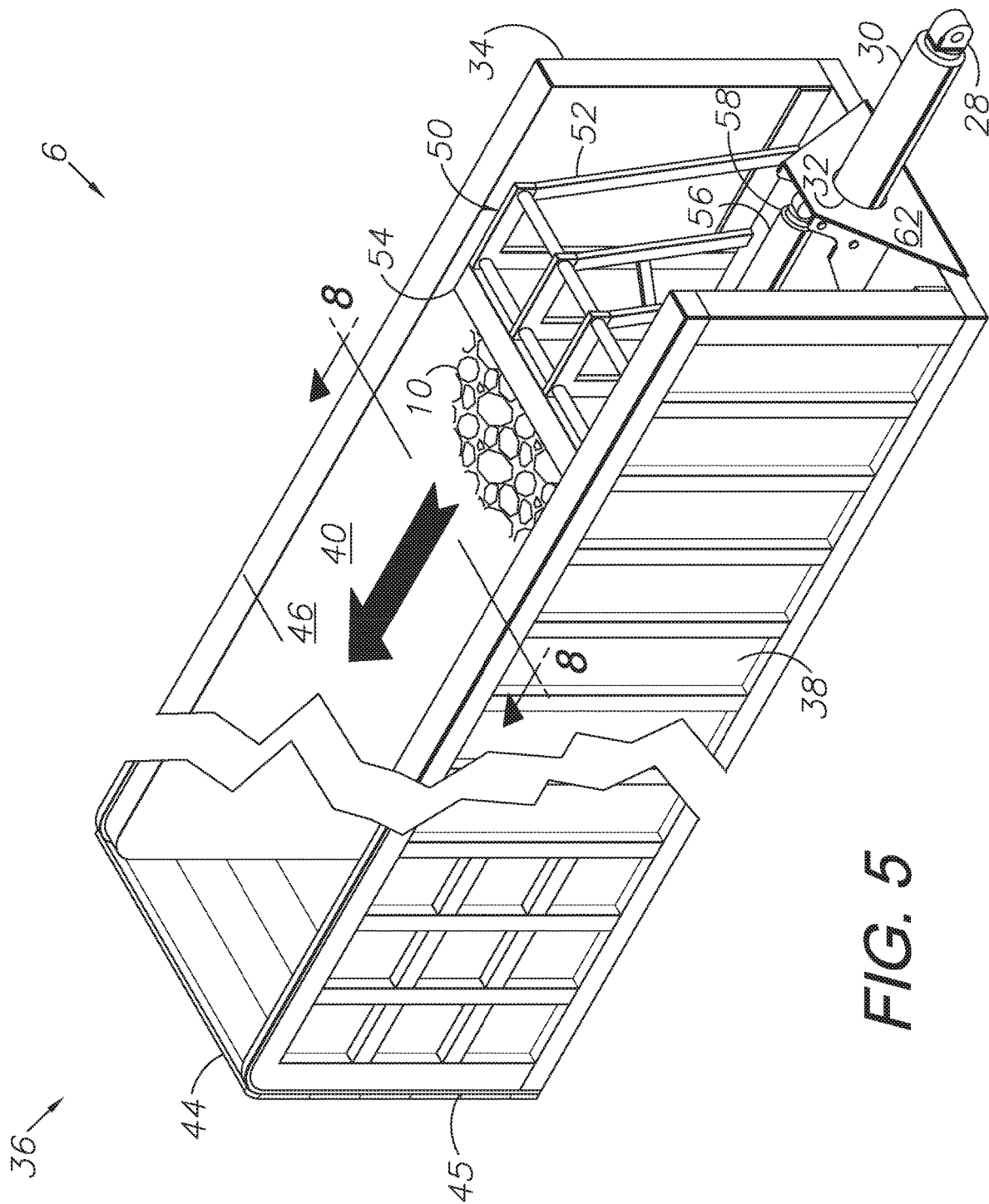
FIG. 5 is a fragmentary, upper, front perspective view of the container packer, with a blade assembly thereof in a retracted position.
Figure 6:
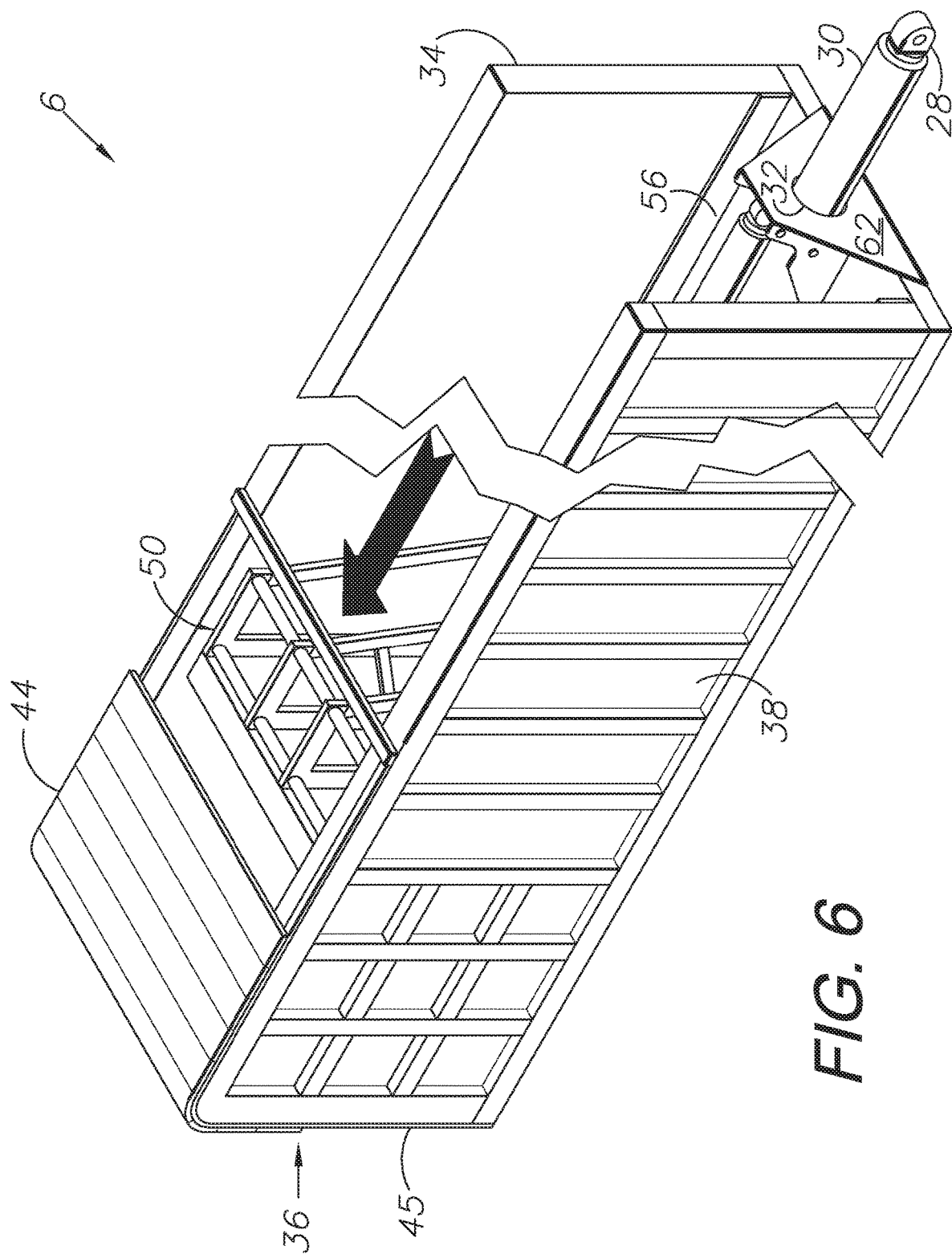
FIG. 6 a fragmentary, upper, front perspective view of the container packer, with the blade assembly thereof in an extended position.
Figure 7:
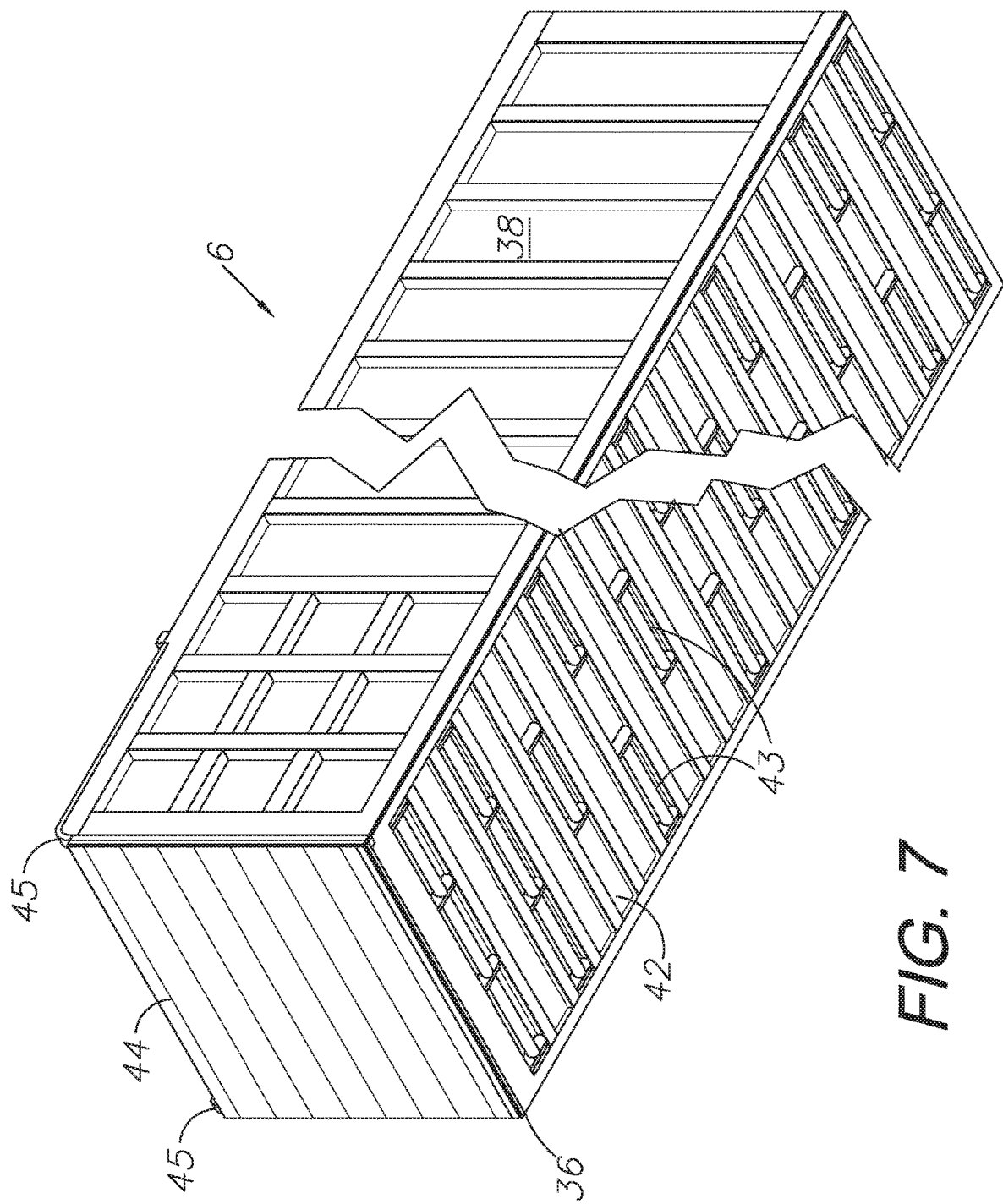
FIG. 7 is a fragmentary, lower, back perspective view of the container packer.
Figure 8:
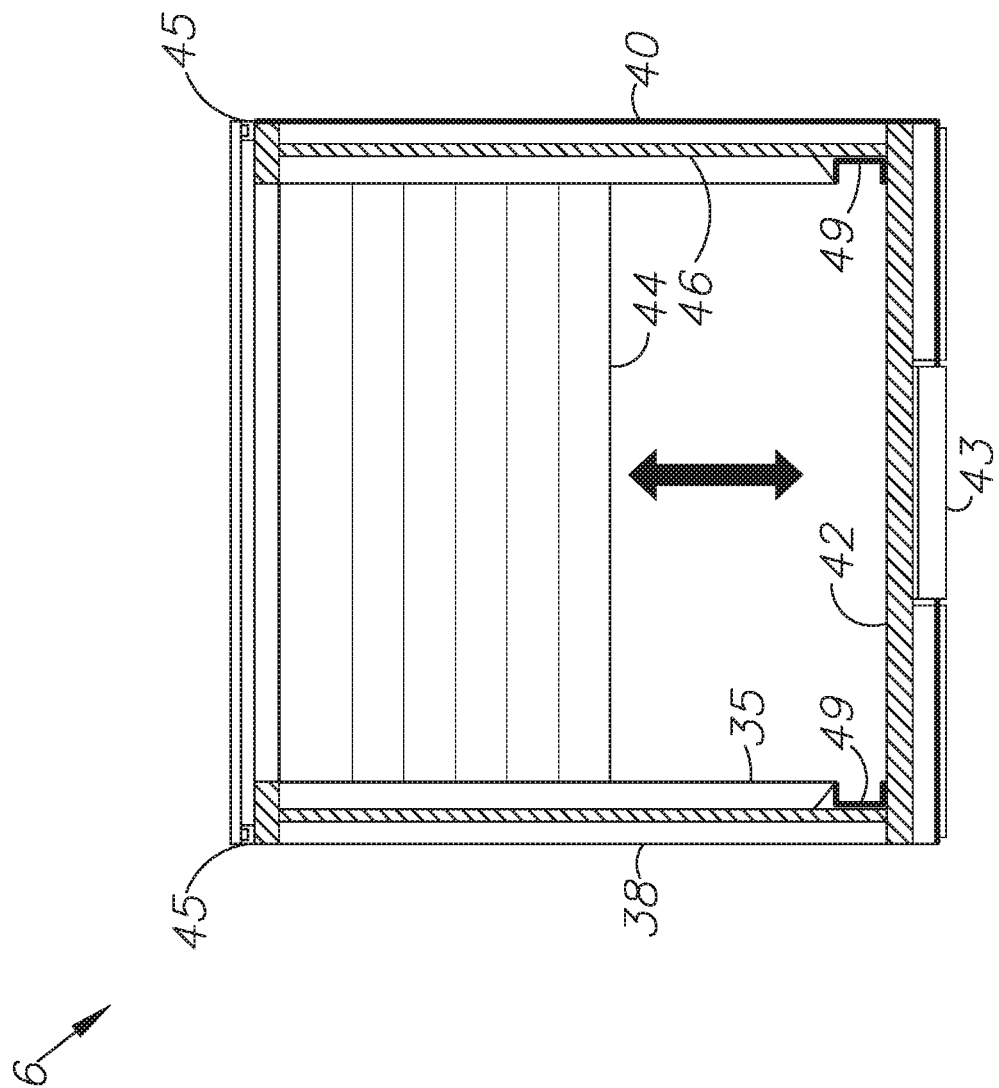
FIG. 8 is a vertical cross-sectional view of the container packer taken generally along line 8-8 in FIG. 5.

The container packer 6 includes a material transfer assembly 47, an embodiment of which includes a push blade assembly 50, which includes a structural framework 52 mounting a push blade 54, which fits relatively closely within the container packer interior 46 and extends transversely for movement fore-and-aft guided by tracks 49 formed in the container packer sidewalls 38, 40 whereby substantially all of the contents of the container packer 6 can be discharged through the back door opening 35. The push blade assembly 50 includes a framework 52 mounting a push blade 54 generally configured as a panel with width and height dimensions generally corresponding to a cross-section of the container packer interior 46. A push blade piston-and-cylinder 56 extends through the framework 52 and the blade 54, to which the piston-and-cylinder 56 is attached in a trunion-type mounting 57. The piston-and-cylinder unit 56 includes an extension 60, which extends distally of the blade 54 with the piston-and-cylinder 56 in a retracted position (FIG. 4). With this configuration a relatively long effective stroke of the piston-and-cylinder 56 is available for pushing the push blade assembly 50 through a substantial portion of the container packer 6. An anchor structure 62 is mounted on the container packer floor 42 adjacent to the container packer back end 36 and is connected to the piston-and-cylinder proximate end 58.

Figure 9:
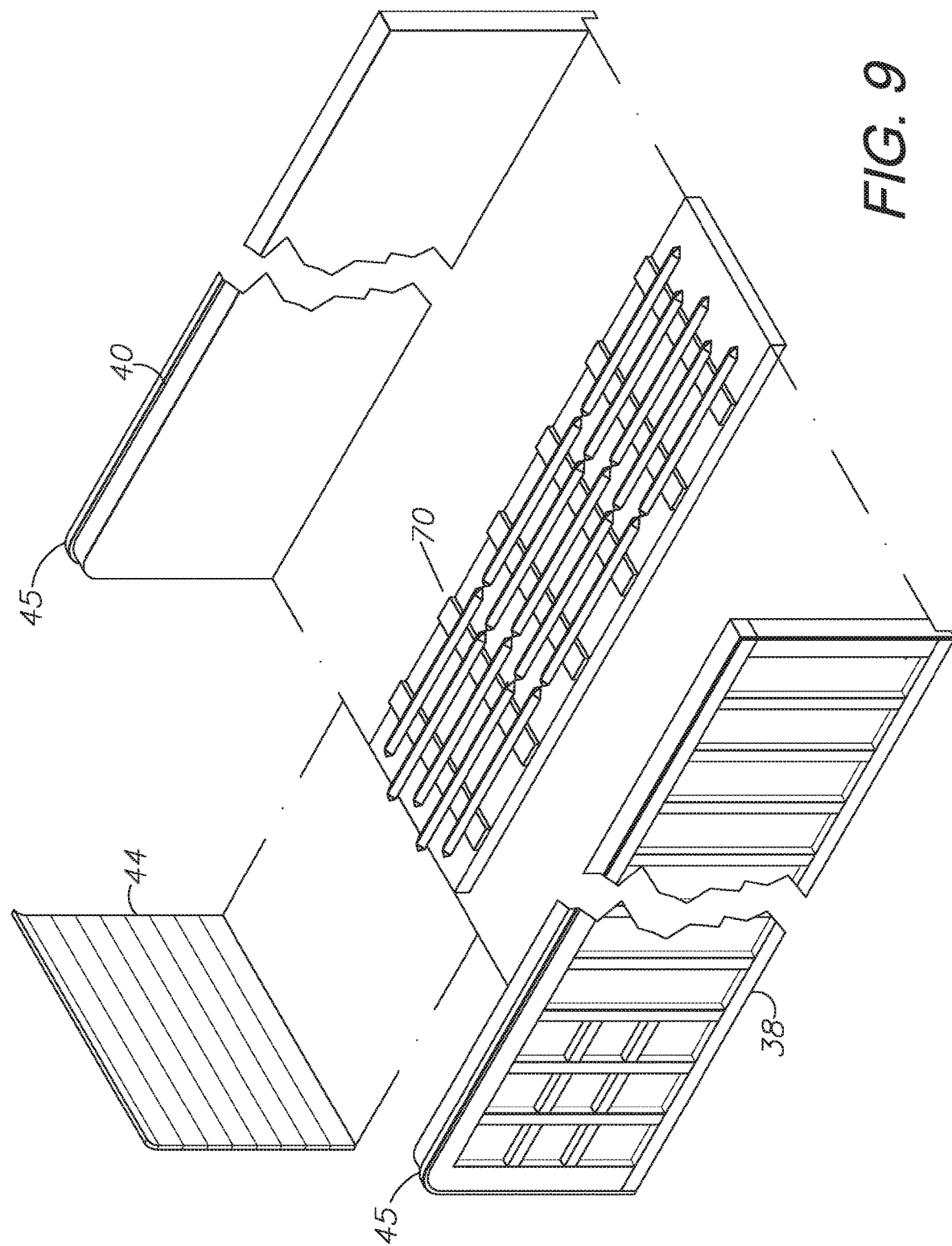
FIG. 9 is an exploded view of a container packer comprising an alternative aspect of the present invention, shown with a moving floor.

FIG. 9 shows an alternative embodiment wherein a moving floor 70 is used to eject material from the container packer in place of the push blade assembly 50. The moving floor is essentially a series of moving, powered slats that operate to move material out of a contained space. This may be a preferable method of unloading the container packer when compaction of the material to be unloaded is not desirable.

IV. Operation

In the practice of an aspect of the method of the present invention, the operation of the system 2 is sequenced to transfer bulk material 10 from the container packer 6 to the transport container 8. The container 8 is positioned in alignment with the transfer base 4. For example, the container 8 may be placed on a trailer or truck bed for transport. The hydraulic leveling jacks 22 are adapted for independent adjustment to align the transfer base 4 with the container 8. An automated positioning system can be utilized to automatically adjust the transfer base 4 for optimal alignment.

Figure 2:
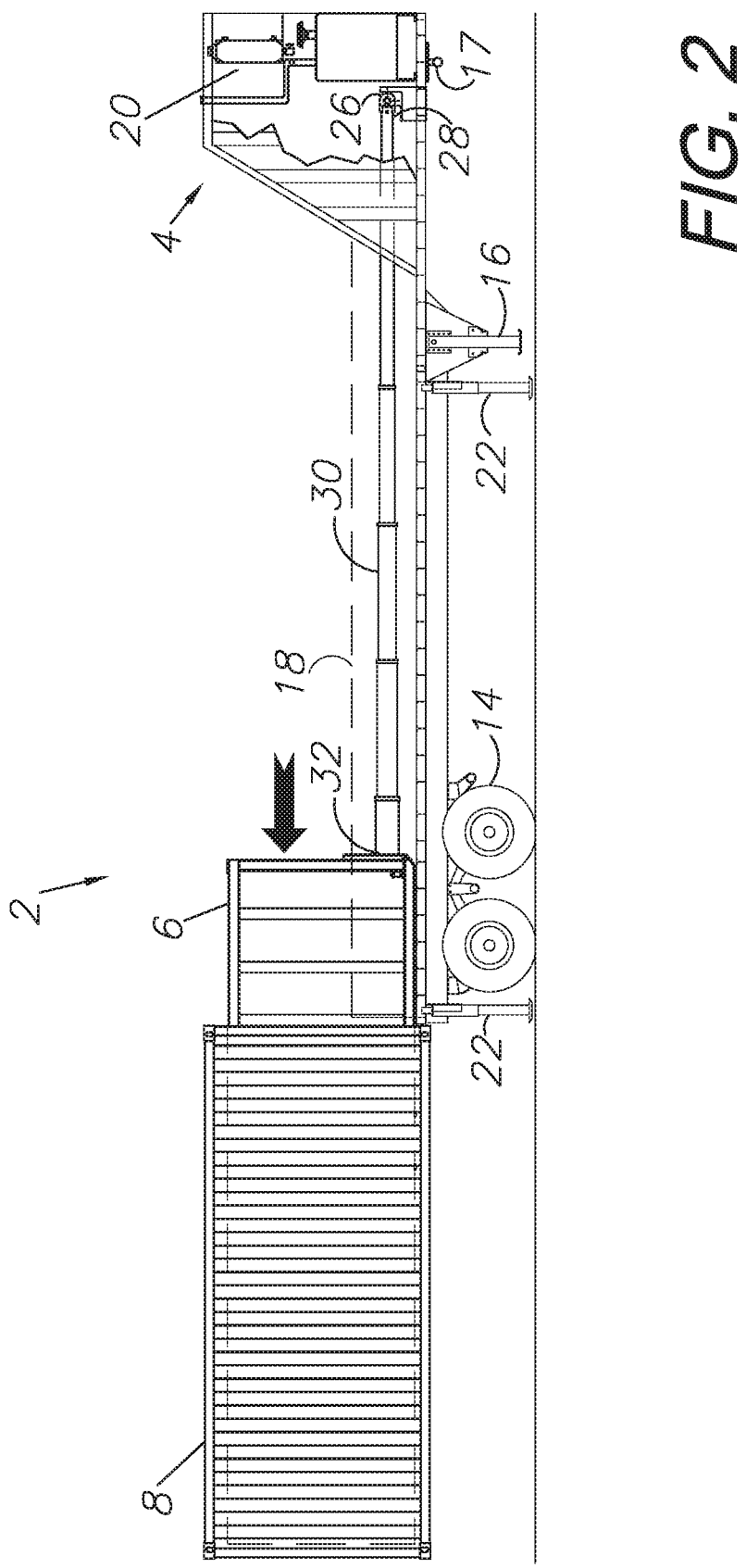
FIG. 2 is a side elevational view thereof, shown with the container packer extended partly into the transport container.
Figure 3:
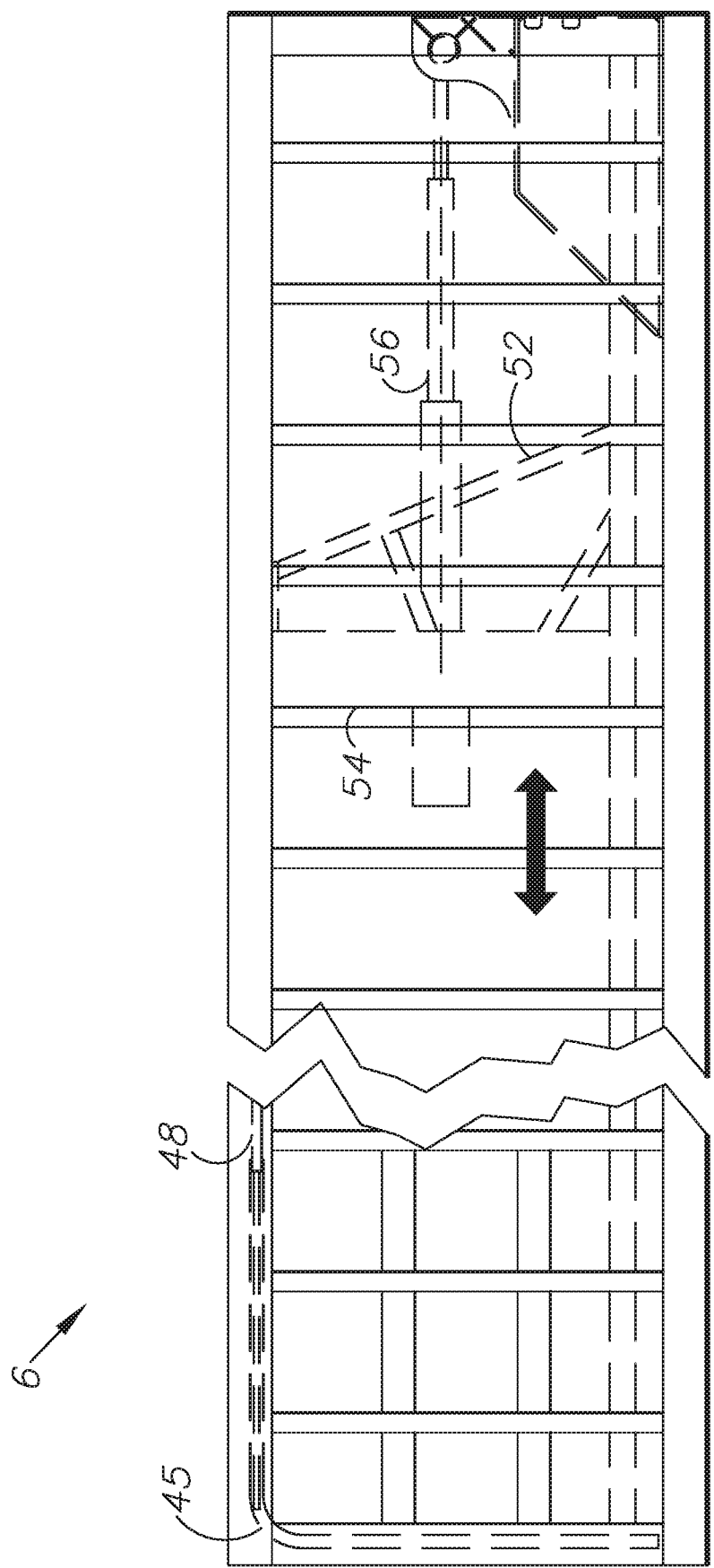
FIG. 3 is an enlarged, fragmentary, side elevational view of the container packer.

With the transfer base 4 and the container properly aligned, the container packer 6 starts from a retracted position (FIG. 1) and is pushed rearwardly by the container packer piston-and-cylinder unit 30 to an extended position (FIG. 2). The container packer door 44 is raised hydraulically via the piston-and-cylinder units 48, thus opening the back opening 35 for discharge of the bulk material 10. Applying hydraulic power to the piston-and-cylinder unit 56 extends it and pushes the push blade assembly 50 rearwardly through the container packer interior 48. The blade 54 pushes the bulk material 10 through the back opening 35 and out of the container packer 6 and into the transport container 8. Depending upon the nature of the bulk material 10, it may be compacted by the push blade assembly 50 in the transport container 8. Simultaneously with discharging the contents 10 of the container packer 6, the hydraulic system can open the hydraulic lines to the container packer piston-and-cylinder unit 30, allowing it to retract as the contents are pushed out of the container packer interior 46. The container packer piston-and-cylinder unit 30 can also be powered to hydraulically extract the container packer 6 by collapsing to its retracted position (FIG. 1). Upon full extraction of the container packer 6, the transport container 8 can be closed and removed for transport.

It will be appreciated that various steps of the procedure described above, and additional steps, can be automated with a programmable microprocessor. For example, leveling the transfer base 4, inserting the container packer 6 and operating the push blade assembly 50 can all be automated. Moreover, hydraulic controls utilizing a multi-position valve(s) can be provided for an operator to control the functions of the system 2. Such a valve(s) can also be automated.

V. Alternative Embodiment or Aspect Container Packer System 102

Figure 11:
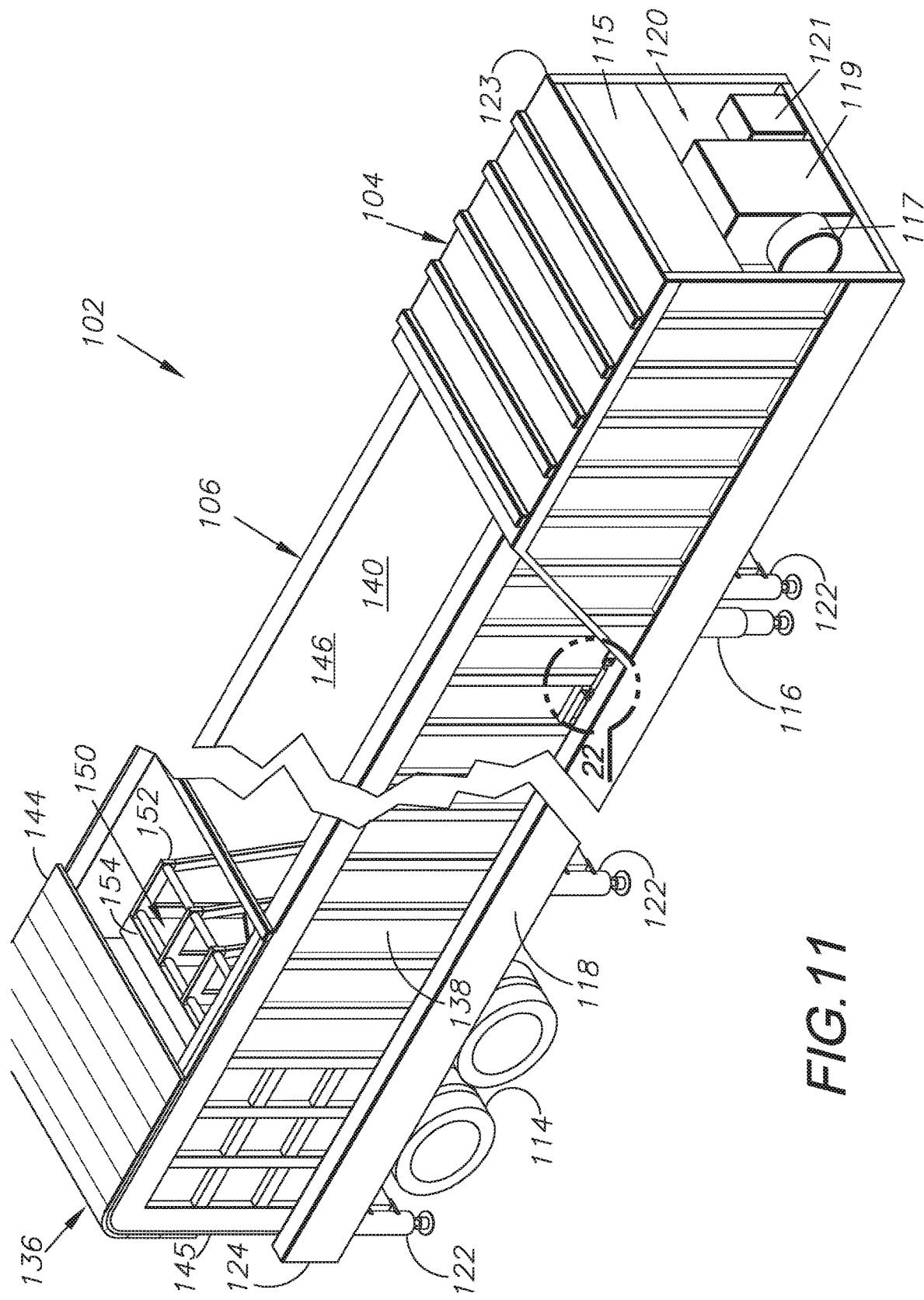
FIG. 11 is a fragmentary, upper, front perspective view of the transfer base with an internal combustion engine, a hydraulic pump, and hydraulic control valves.
Figure 12:
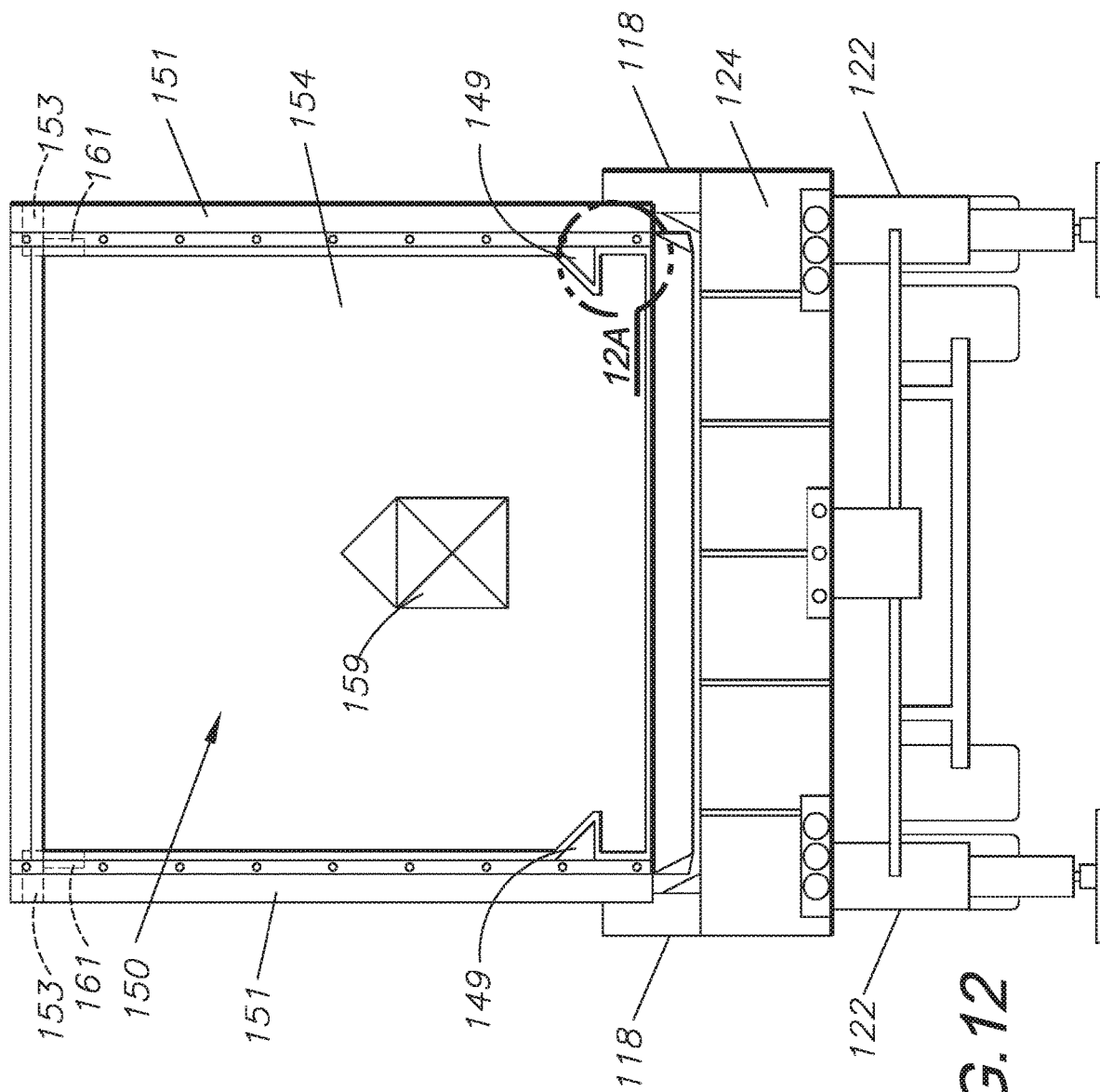
FIG. 12 is a back elevational view of the transfer base and the container packer, with a blade assembly thereof in an extended position.

A container packer system 102 comprising yet another embodiment or aspect of the present invention is shown in FIGS. 11-26. Referring to FIGS. 11-13, the container packer system 102 includes a transfer base 104, reciprocally and slidably mounting a container packer 106. A transfer container 108 receives bulk material 110 from the container packer 106.

The transfer base 104 is similar to the transfer base 4 described above. The transfer base 104 can be generally constructed as a flatbed trailer with a bed 112 mounting a wheel truck 114, a pair of adjustable-height main jacks 116, and a pair of sidewalls 118 mounted on either side of the bed 112.

The transfer base 104 includes three pairs of leveling jacks 122*a,b,c* in the front, center and back of the transfer base 104. The leveling jacks 122*a,b,c* are mounted on jack beams 224, which support the transfer base support beams 228 on scales 226. The scales 226 are used to monitor the amount of bulk material 110 transferred into the transport container 108. The scale 226 readout can be accessed remotely by an operator loading the container packer 106 to monitor the weight and add or decrease weight as needed. A typical load is for a specified amount of material, which must satisfy strict road weight limits and likely determines the value of the load. The scales may be any analog or digital scale capable of reading the load-weight of a transport vehicle.

The transfer base 104 includes a power subsystem 120, which includes an internal combustion engine 119, a hydraulic pump 117, a hydraulic reservoir 115, a hydraulic control valve 121, and other hydraulic components, equipment, lines, and fittings as needed. Alternatively, other power sources can be utilized, such as pneumatic, electric, combination hydraulic-pneumatic-electric, etc. External power sources, e.g., electrical service, can be connected to the transfer base 104 for powering its operation.

Figure 24:
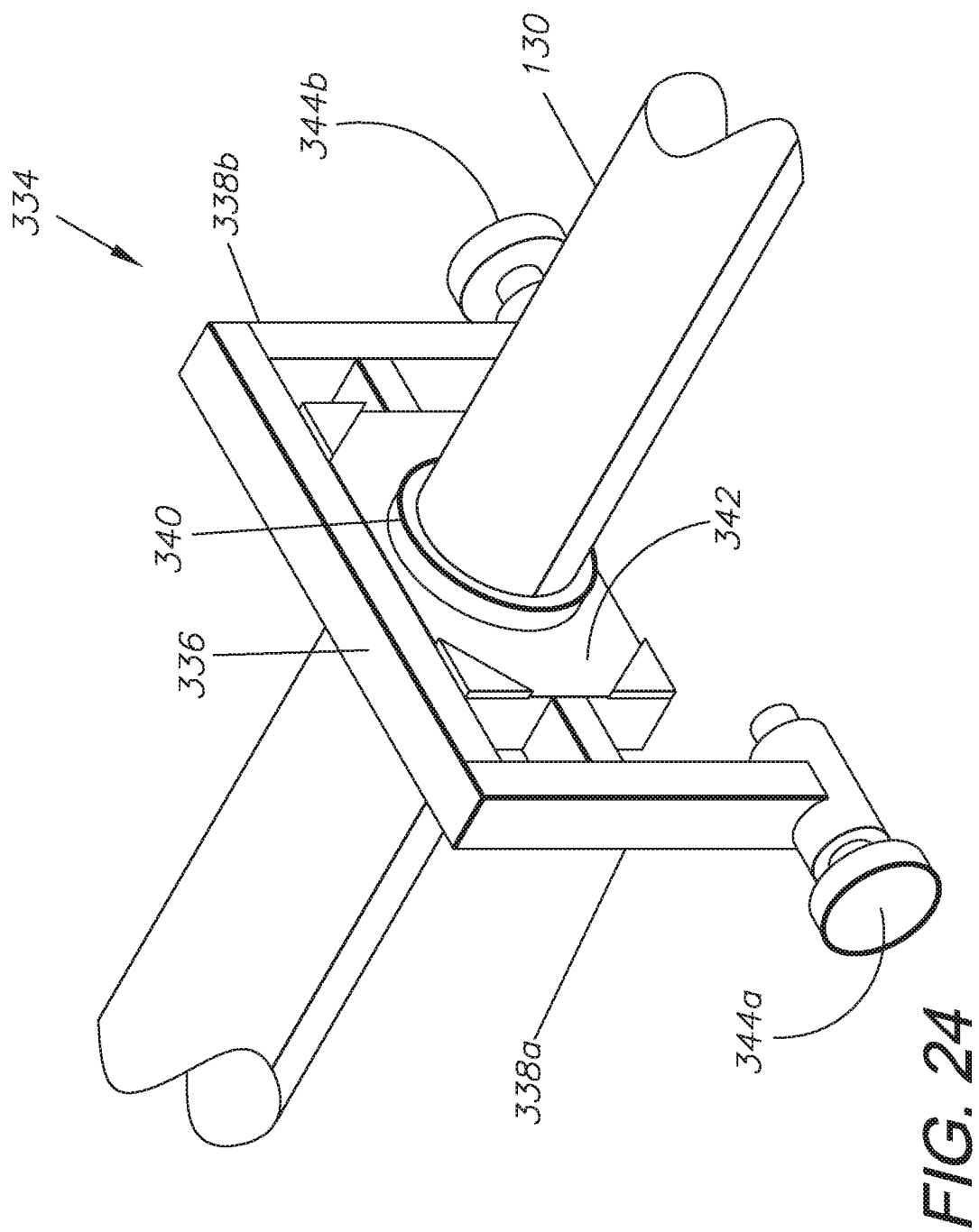
FIG. 24 is an upper, front perspective of the third stage carrier on the container packer piston-and-cylinder.

A front cylinder mount 126, similar to that described above in FIG. 1, is located on the transfer base 104 in proximity to the power subsystem 120 and mounts a proximate end 128 of a multi-stage insertion/extraction piston-and-cylinder unit 130, which also includes a distal end 132 connected to the container packer 106. The piston-and-cylinder unit 130 is supported by a third-stage carrier 334 to prevent sagging when the piston-and-cylinder unit 130 is extended. The third-stage carrier 334 is comprised of a cross beam 336, vertical members 338*a,b*, rollers 344*a,b*, a connection box 342, and a catch piece 340 (FIG. 24).

Figure 20:
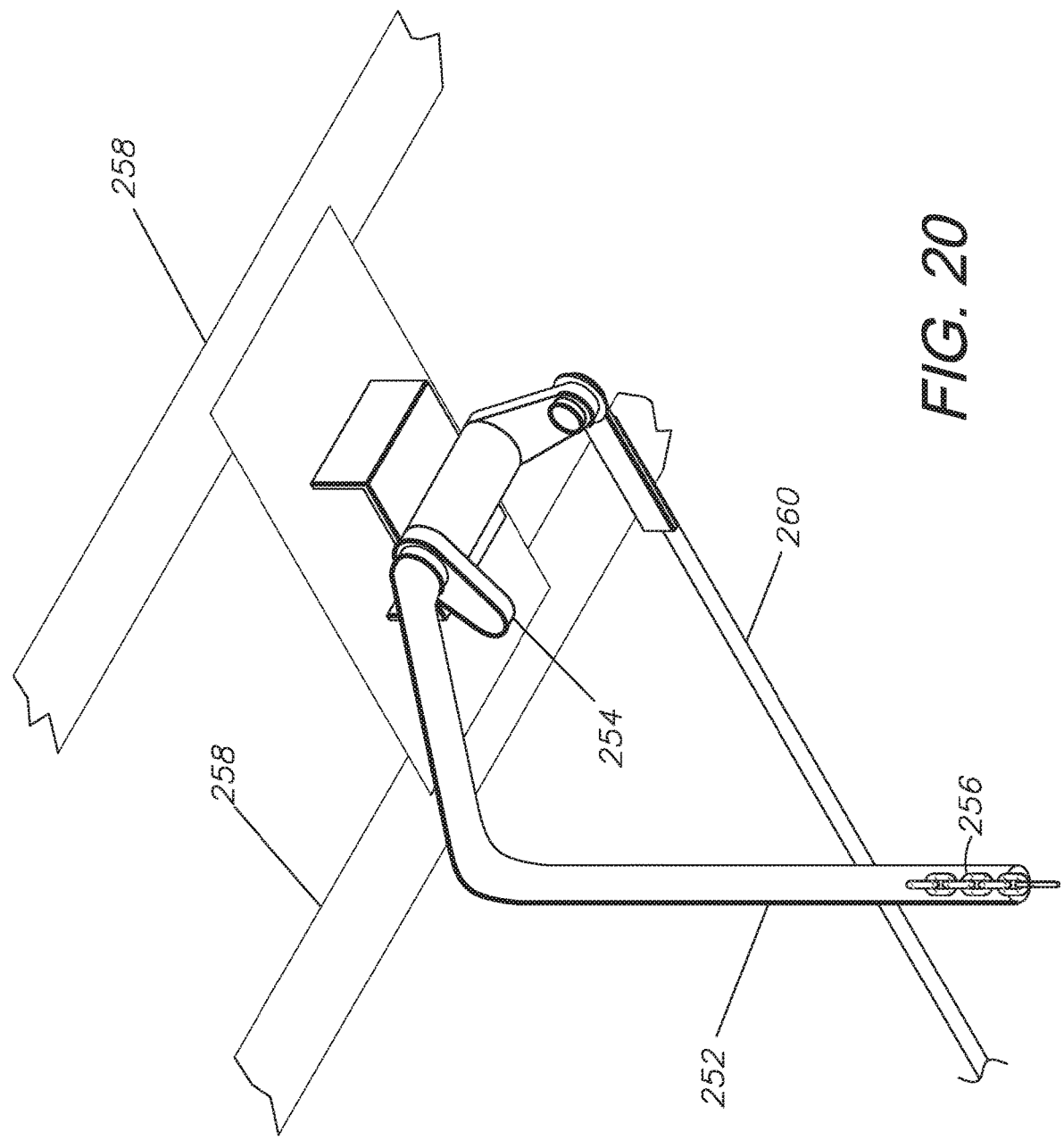
FIG. 20 is a lower, front perspective of the transportation latch handle used to engage the transportation latch for the container packer.
Figure 21:
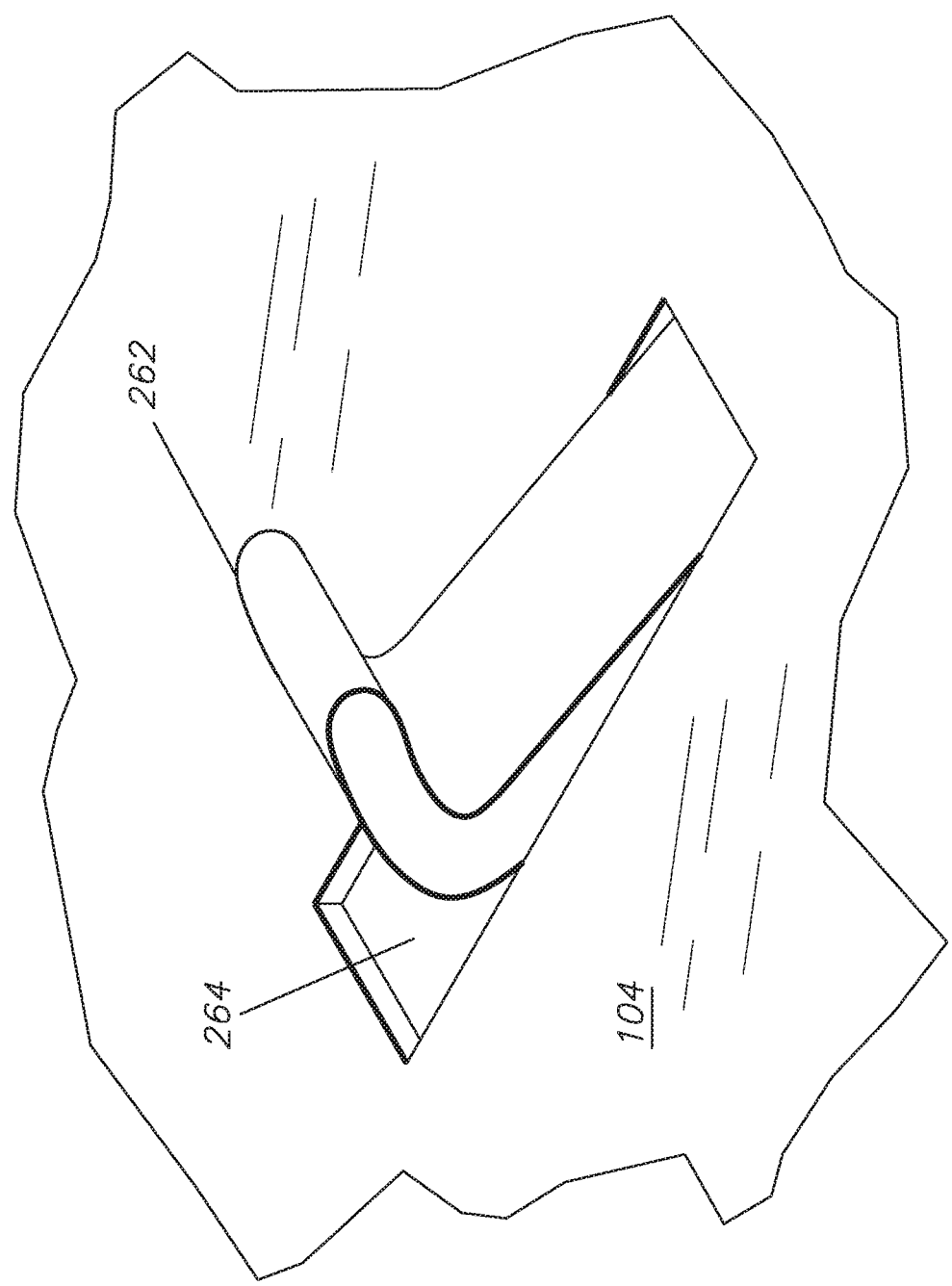
FIG. 21 is an upper, front perspective of the transportation latch for the container packer.

A transport latch 262 is located in an opening 264 of the bed 112 of the transfer base 104 to prevent the container packer 106 from sliding off the back end 124 of the transfer base 104 during transportation of the container packer system 102 (FIGS. 20 and 21). The latch 262 is engaged by a handle 252 located at the front end 123 of the transfer base 104. The handle 252 has a stop guard 254 which stops the handle 252 once the latch 262 is engaged and a chain 256 to lock the handle 252 in place. The handle 252 is connected to the latch 262 by a pole 260.

Figure 16:
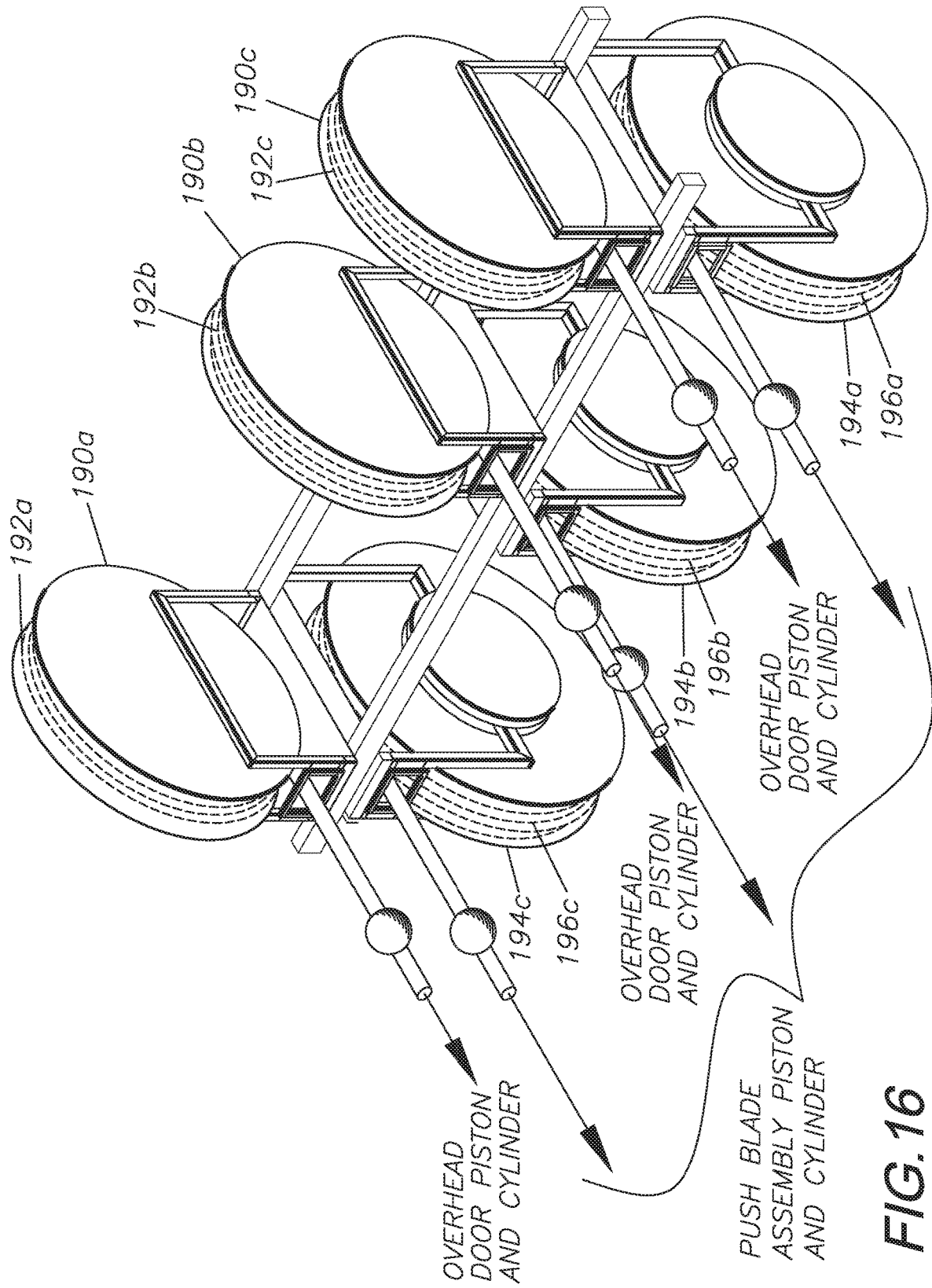
FIG. 16 is an upper, back perspective of the hydraulic hose reels.

The container packer 106 includes: front and back ends 134, 136; opposite sidewalls 138, 140; and a floor 42 mounting rollers 43 on which the container packer 106 rolls fore-and-aft. A rolling overhead door 144 (FIG. 11) is mounted generally on a pair of tracks 145 outside of the container packer 106, and selectively closes a back opening 135, which is formed in the back end 136 for selectively enclosing a container packer interior 146, which receives the bulk material 110. The door 144 is operated by a door piston-and-cylinder unit 148, which is attached to hydraulic fluid supply and return lines 192*a,b,c*. The supply and return lines 192*a,b,c* are attached to a hydraulic pump 117 and supported by hydraulic hose reels 190*a,b,c* (FIG. 16).

Figure 12A:
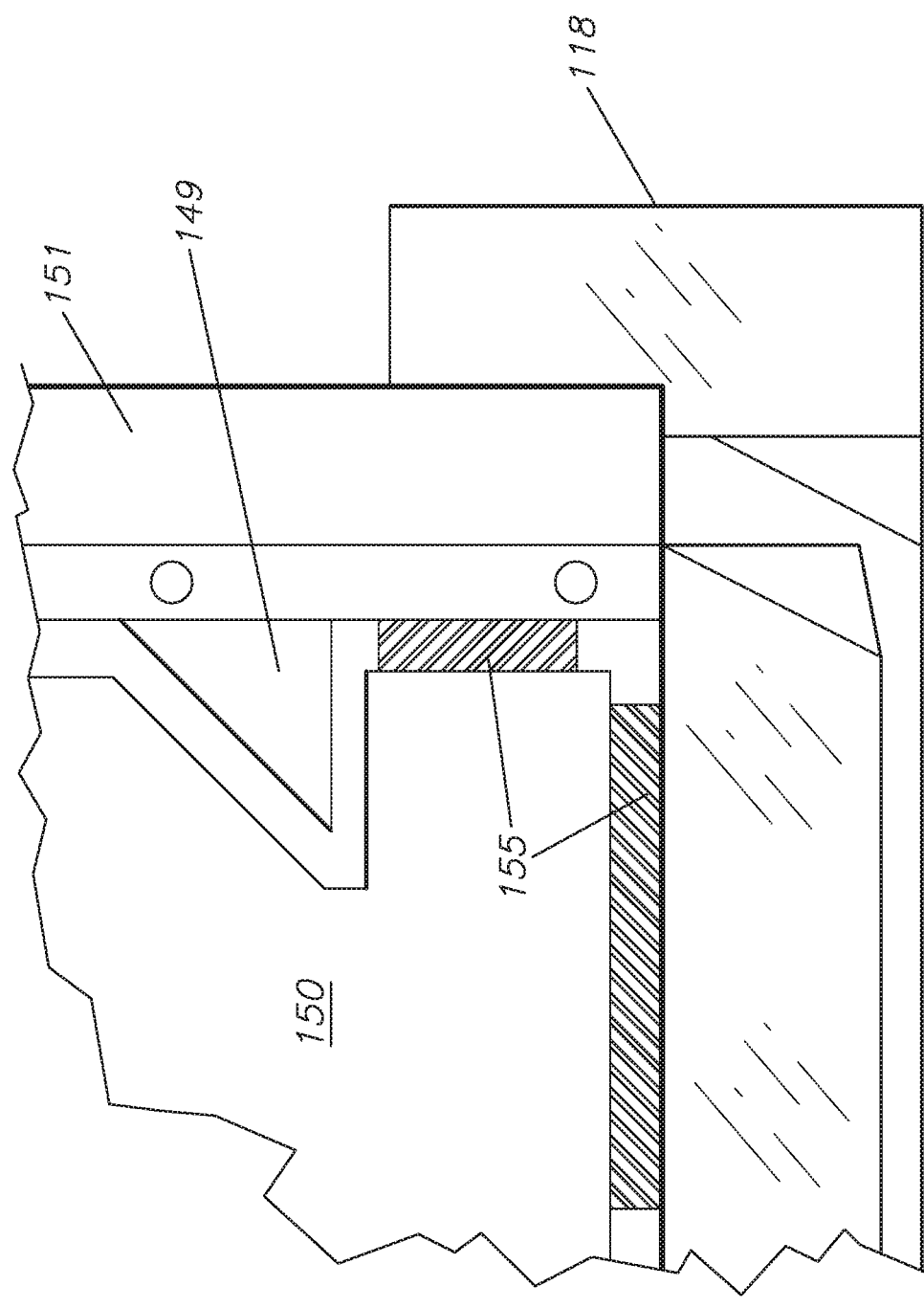
FIG. 12A is an enlarged back elevational view of the push blade assembly track.
Figure 17:
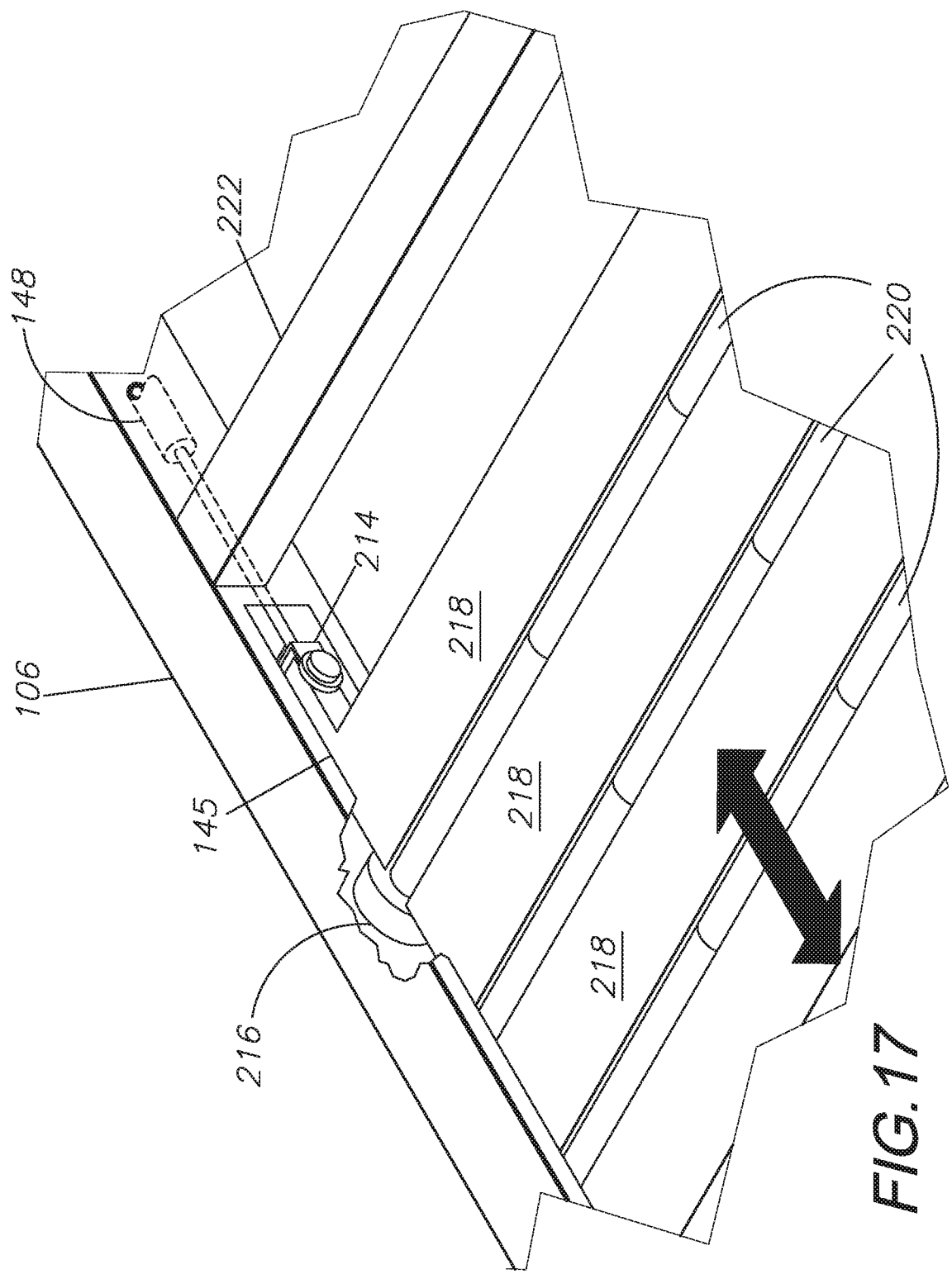
FIG. 17 is a fragmentary, upper, back perspective of the overhead door.
Figure 18:
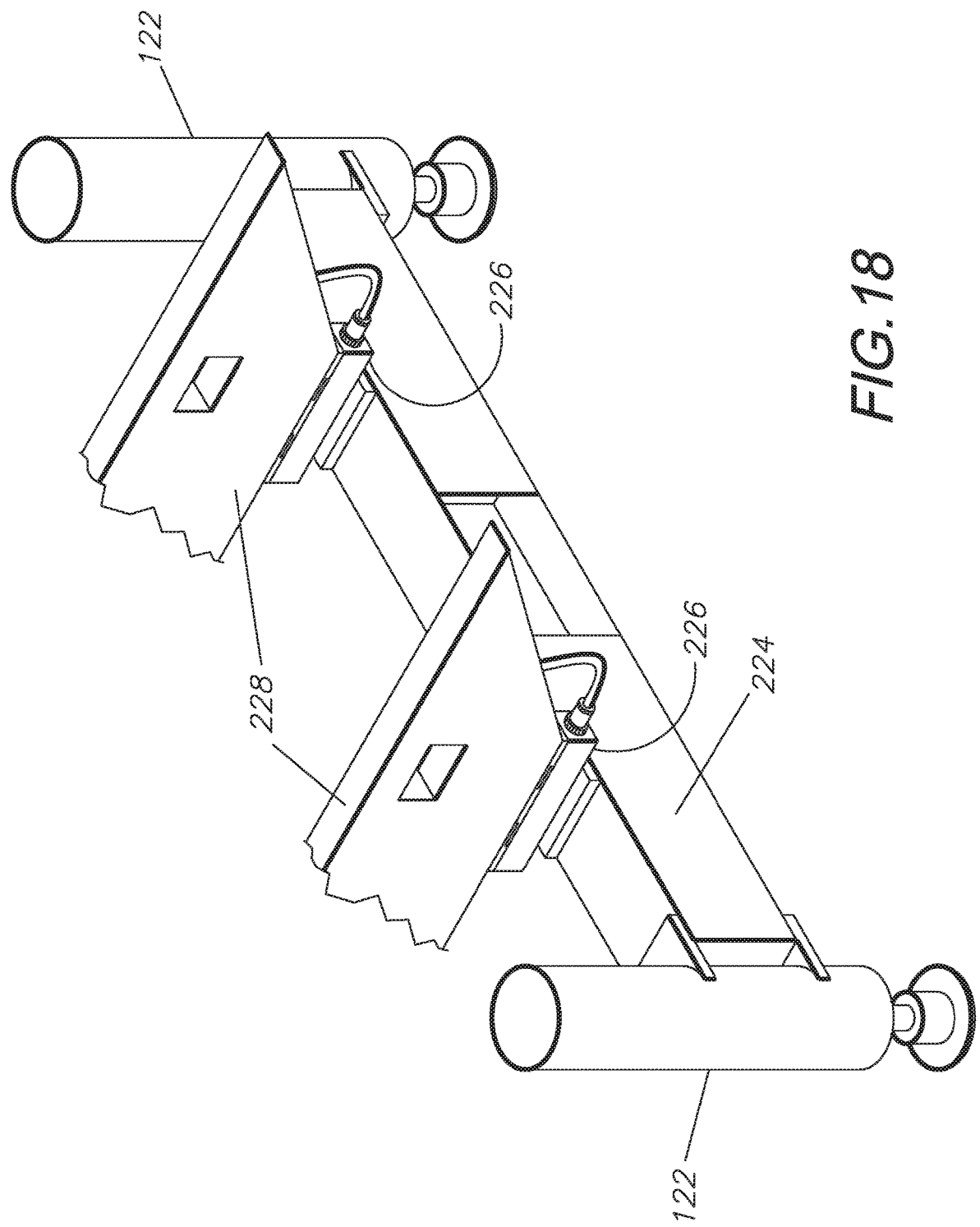
FIG. 18 is a fragmentary, upper, front perspective of the scales mounted on jack beams.

The door 144 is attached to the door piston-and-cylinder unit 148 by a clevis 214. The door 144 is comprised of panels 218 connected at roller hinges 220. The roller hinges 220 are connected to rollers 216, which are mounted in the door track 145 (FIG. 17). Optimally, the door tracks 145 are mounted such that the door 144 is raised and lowered externally from the interior of the container packer 106. This prevents material from jamming the door 144. Alternatively, other types of doors and operating mechanisms can be utilized. Side guards 151 are connected to the sidewalls 138, 140 of the container packer at the back end 136 (FIGS. 12 and 12A). The side guards 151 are flush against the transport container 108 to prevent bulk material 110 from getting caught between the transport container 108 and the container packer 106. Structural container packer support beams 222 may be incorporated to strengthen the container packer structure, or the side-walls of the container packer may be substantially reinforced to eliminate the need of support beams along the top of the packer assembly.

The container packer 106 includes a push blade assembly 150, which is constructed from a structural framework 152 mounting a push blade 154, which fits relatively closely within the container packer interior 146 and extends transversely for movement fore-and-aft guided by tracks 149 formed in the container packer sidewalls 138, 140 whereby substantially all of the contents of the container packer 106 can be discharged through the back door opening 135. The push blade track 149 may optionally be lined with UHMW plastic material 155, which prevents shock load and increases the capacity of bulk material 110 that can be loaded. The push blade assembly 150 includes a framework 152 mounting a push blade 154 generally configured as a panel with width and height dimensions generally corresponding to a cross-section of the container packer interior 146. A push blade piston-and-cylinder 156 extends through the framework 152 and the blade 154, to which the piston-and-cylinder 56 is attached in a trunion-type mounting 157. The opposing end of the piston-and-cylinder is affixed to the rear face of the blade push blade assembly 150, and is protected by a steel cover 159 on the front face of the assembly.

A pair of structural rails 153 is affixed to the inside of the container packer 106. The rails 153 receive a number of rollers 161 affixed to the upper edge of the push blade assembly 150. The rollers 161 guide along the rails 153 when the push blade assembly is in motion, and they prevent the blade 154 from lifting away from the base of the container packer 106 when the blade 154 contacts material. The rollers 161 also prevent the blade 154 from lifting or otherwise becoming displaced if a piece of material becomes lodged beneath the blade assembly 150 bottom edge.

The piston-and-cylinder unit 156 is attached to hydraulic fluid supply and return lines 196*abc*. The supply and return lines 196*abc* are attached to a hydraulic pump 117 and supported by hydraulic hose reels 194*abc* (FIG. 16). The piston-and-cylinder unit 156 includes an extension 160, which extends distally of the blade 154 with the piston-and-cylinder unit 156 in a retracted position. With this configuration a relatively long effective stroke of the piston-and-cylinder unit 156 is available for pushing the push blade assembly 150 through a substantial portion of the container packer 106. An anchor structure 162 is mounted on the container packer floor 142 adjacent to the container packer back end 136 and is connected to the piston-and-cylinder 156 end. The piston-and-cylinder unit 156 is supported by a third-stage carrier 346 to prevent sagging when the piston-and-cylinder unit 156 is extended. The third-stage carrier 346 is comprised of: a cross beam 348, carrier arms 358*a,b*; vertical members 350*a,b*; rollers 356; a connection box 354; and a catch piece 352.

Figure 19:
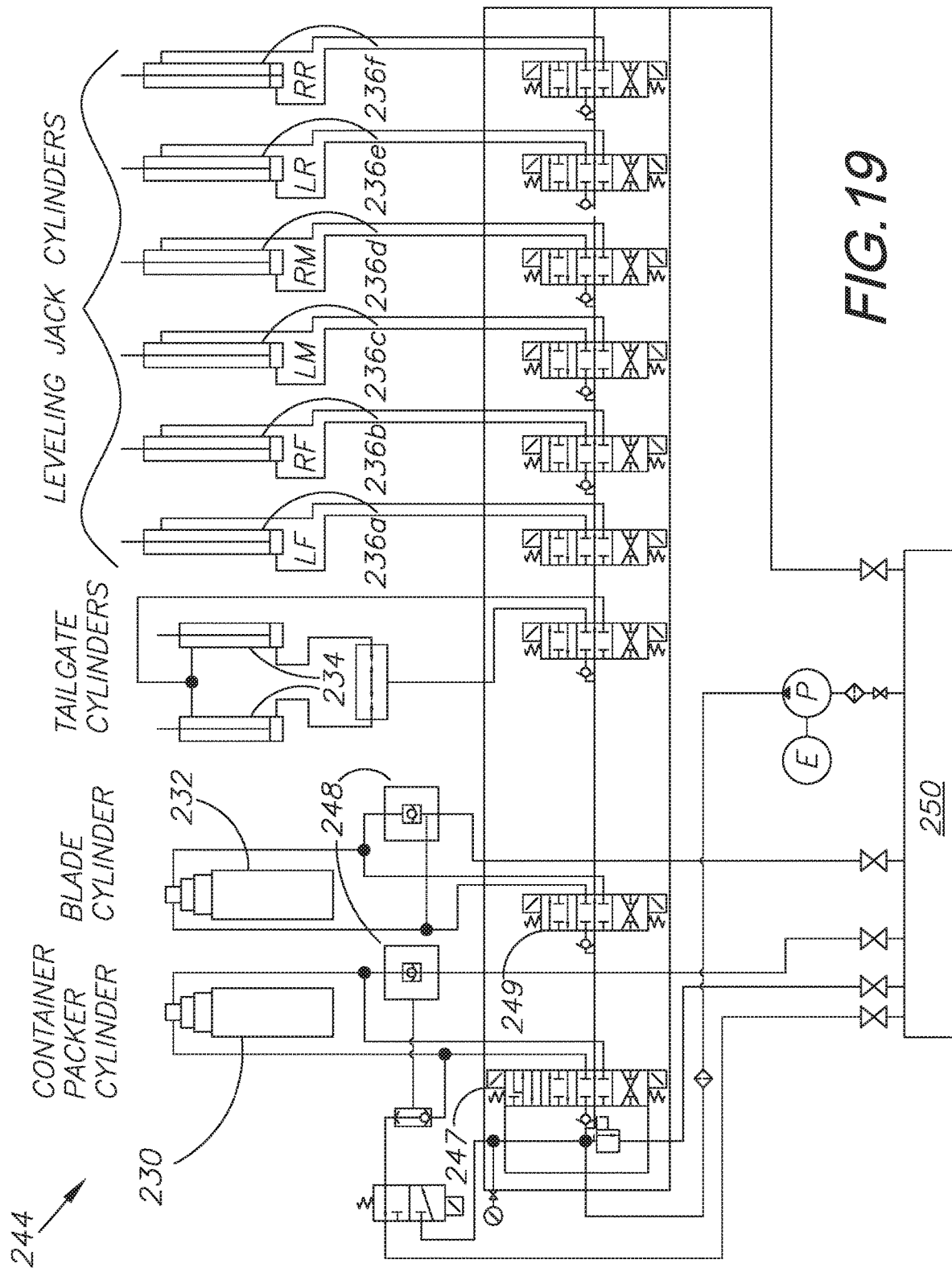
FIG. 19 is a hydraulic piping diagram for the container packer system.

FIG. 19 shows a hydraulic circuit 244 of the container packer system 102. The fluid for the hydraulic system is stored in the hydraulic reservoir 250. Fluid is sent to the container packer cylinder 230 through a valve stack 247 including a proportional valve. Fluid is sent to the blade cylinder 232 through a valve stack 249 including a non-proportional valve. The container packer cylinder 230 and the blade cylinder 232 are connected to dump valves 248. Overhead door (tailgate) cylinders 234 and leveling jack cylinders 236*a-f* are shown in FIG. 19.

When the control switch 178 for the container packer sleeve 106 is operated, hydraulic fluid leaves the hydraulic reservoir 250 and travels to the container packer cylinder 230 through its proportional valve 247. The proportional valve allows the container packer 106 to be moved at varying speeds. The further the container packer control switch 178 is pressed in either direction, the faster the container packer sleeve 106 will move. When retracting the container packer, hydraulic fluid returns to the reservoir 250. A dump valve 248 is included in the circuit to accommodate large amounts of hydraulic fluid returning to the reservoir 250 at one time.

When the blade control switch 180 is operated, hydraulic fluid leaves the hydraulic reservoir 250 and travels to the container packer cylinder 232 through its non-proportional valve 249. Because this valve is non-proportional, the blade 154 moves at a constant rate of speed during operation. The blade 154 is configured to either actively move at a constant rate, or to stop completely. A dump valve 248 is also included in the circuit to accommodate large amounts of hydraulic fluid returning to the reservoir at one time.

In the practice of an aspect of the method of the present invention, the operation of the system 102 is sequenced to transfer bulk material 110 from the container packer 106 to the transport container 108. The container 108 is positioned in alignment with the transfer base 104. For example, the container 108 may be placed on a trailer or truck bed for transport. The hydraulic leveling jacks 122 are adapted for independent adjustment to align the transfer base 104 with the container 108. The leveling jacks 122 can be adjusted using switches 170*a-f* on the control box 121 at the front end 123 of the transfer base 104 or using the switches 182*a-f* on the remote control box 176. An automated positioning system can be utilized to automatically adjust the transfer base 104 for optimal alignment.

With the transfer base 104 and the container 108 properly aligned, the container packer 106 starts from a retracted position and is pushed rearwardly by the container packer piston-and-cylinder unit 130 to an extended position. The container packer door 144 is raised hydraulically via the piston-and-cylinder units 148, thus opening the back opening 135 for discharge of the bulk material 110. Applying hydraulic power to the piston-and-cylinder unit 156 extends it and pushes the push blade assembly 150 rearwardly through the container packer interior 146. The blade 154 pushes the bulk material 110 through the back opening 135, out of the container packer 106 and into the transport container 108. Depending upon the nature of the bulk material 110, it may be compacted by the push blade assembly 150 in the transport container 108.

Simultaneously with discharging the contents 110 of the container packer 106, the hydraulic system can open the hydraulic lines to the container packer piston-and-cylinder unit 130 and operate in a float mode (FIG. 13A), allowing the container packer 106 to retract as the contents are pushed out of the container packer interior 146. The float mode allows the container packer 106 to be ejected from the transport container 108 via the push blade assembly piston-and-cylinder unit 156 using hydraulic pressure created when the bulk material 110 has been fully compressed by the blade 154. In some systems there may not be enough power to hydraulically withdraw the container packer 106 while simultaneously extending the blade 154. The float mode eliminates this problem, while also preventing built up hydraulic pressure from damaging the blade cylinder 156 or the interior of the transport container 108.

Figure 15:
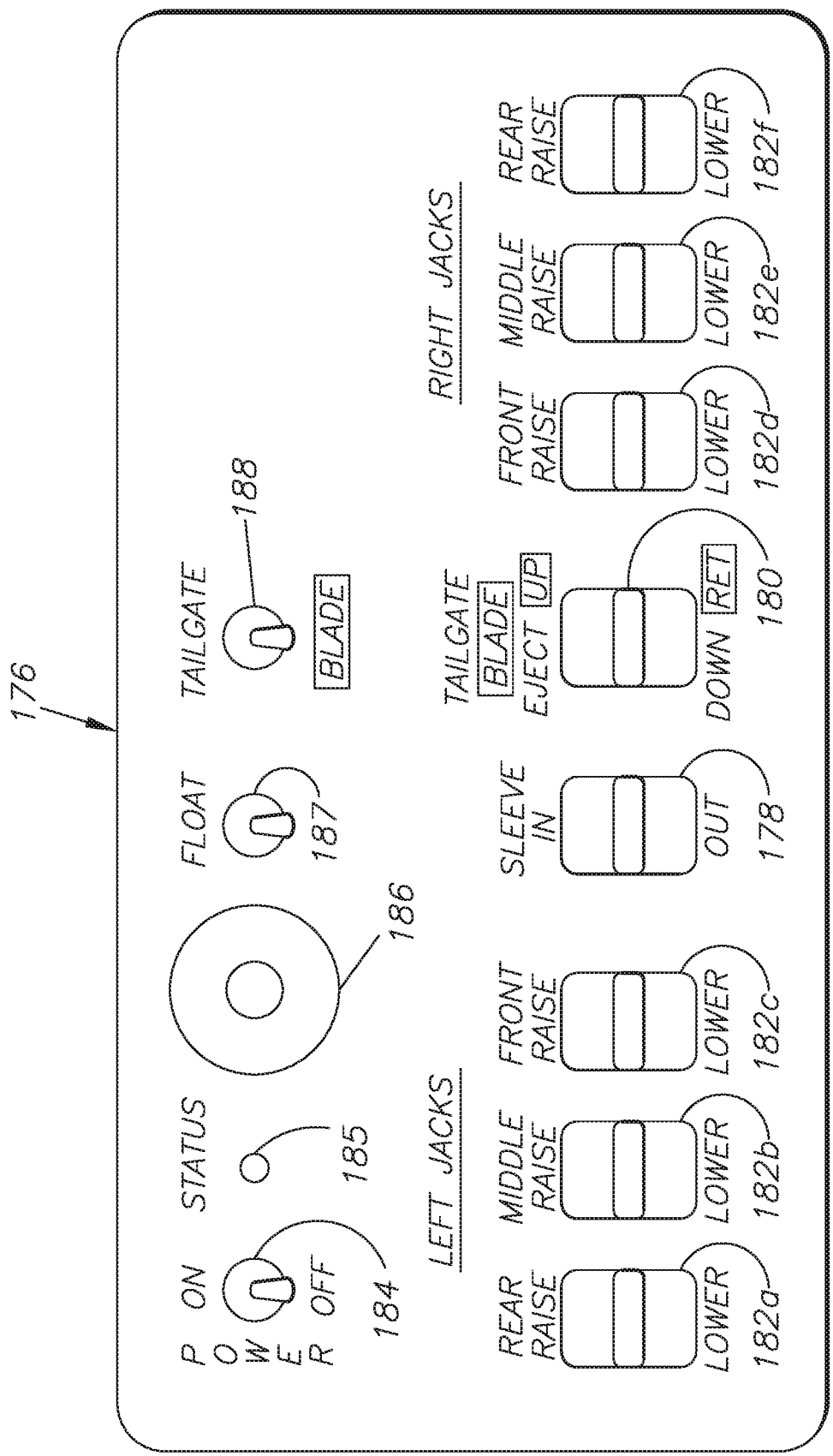
FIG. 15 is a top elevational view of the remote control box.

The container packer piston-and-cylinder unit 130 can also be powered to hydraulically extract the container packer 106 by collapsing to its retracted position. Upon full extraction of the container packer 106, the transport container 108 can be closed and removed for transport. All of these operations can be performed using switches 164, 166, 168 on the control box 121 (FIG. 14) at the front end 123 of the transfer base 104 or using the switches 187, 188, 178, 180 on the remote control box 176 (FIG. 15). The control box 176 includes a hydraulic pressure gauge 172 for measuring the hydraulic pressure of the leveling jacks 122, and a hydraulic pressure gauge 174 for measuring the hydraulic pressure of the push blade assembly piston-and-cylinder unit 156 and the container packer piston and cylinder unit 130. The remote control box 176 also has a power switch 184, on/off status light 185, and an emergency stop switch 186. The remote control box 176 can communicate control instructions to the container packing system 102 wirelessly, e.g., by radio communication, or through a wire directly connected to the container packer system 102.

FIG. 20 shows a transport latch handle 252 including a stop guard 254 and a locking chain 256. The transport latch handle is rigidly connected to a floor support beam 258 of the transfer base 104 floor. FIG. 21 shows a transport latch 262 including a latch opening 264. The transport latch 262 restrains the container packer 106 when it is not in operation. This ensures that the container packer will not slide off of the transfer base 104 unintentionally, such as during transport. The transport latch handle 252 is locked into an engaged position with the locking chain 256 until the container packer 106 is used. At such a time, the transport latch handle 252 is unlocked and activated, thereby depressing the transport latch 262 into the latch opening 264, allowing the container packer 106 to freely extend into an empty transfer container 108.

Figure 22:
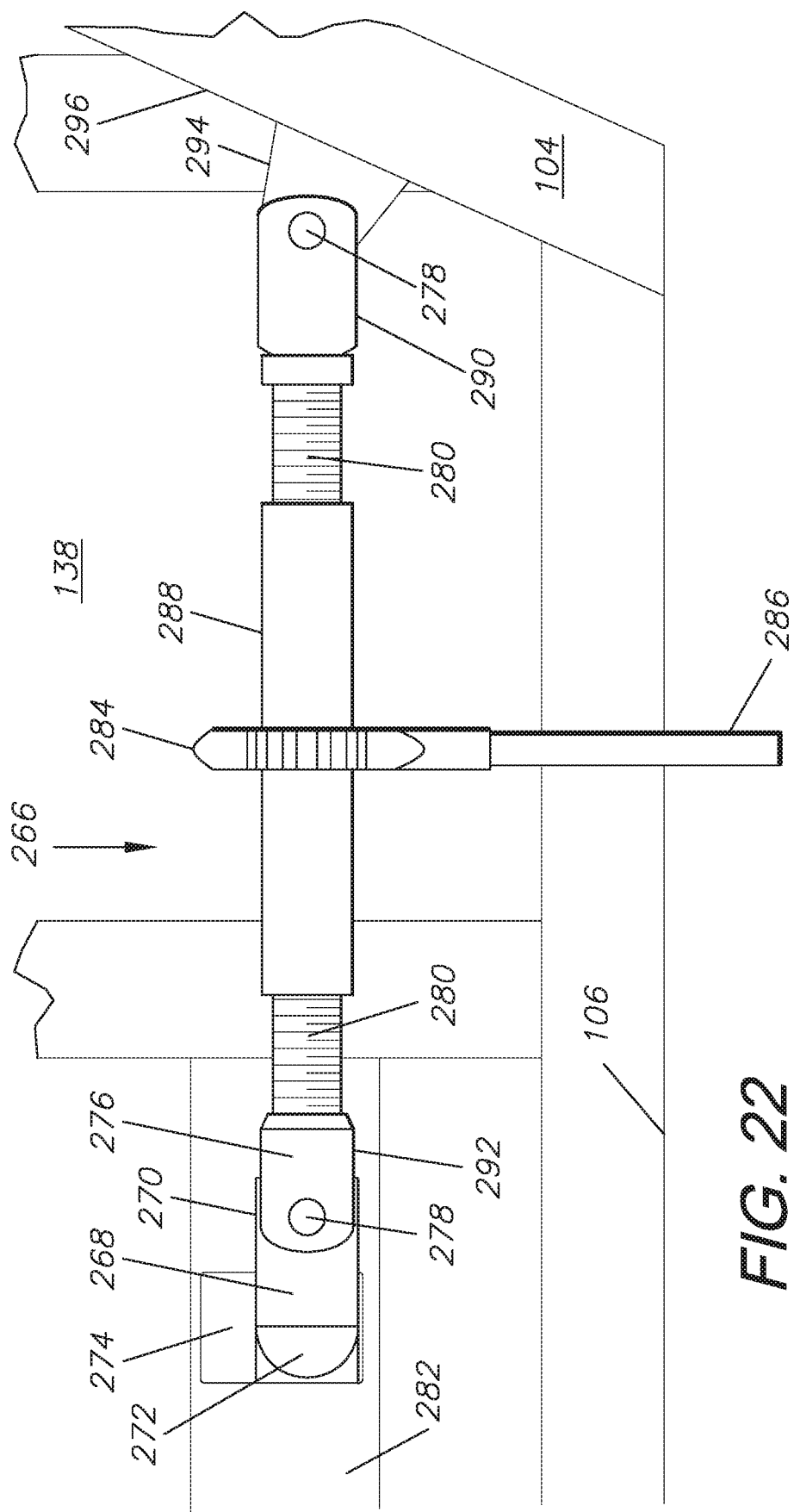
FIG. 22 is a side elevational view of the binder used to connect the container packer to the transfer base during transportation.

FIG. 22 shows a typical ratchet binder 266 capable of connecting the container packer 106 to the transport base 104, as shown more clearly in FIG. 11, to ensure that the container packer does not move until desired. The ratchet binder 266 includes a proximal end 290 and a distal end 292. The ratchet binder distal end 292 connects to the container packer 106 via a fastener 268 with a fastener proximal end 270 and a distal end 272. The container packer 106 includes a fastener receiver 274 within a sidewall crossbeam 282 for receiving the ratchet binder fastener 268 when the container and the transfer base are in close proximity. The fastener 268 is connected to a threaded rod 280 via a clevis 276 and a clevis bolt 278. The ratchet binder proximal end 290 is hingedly connected to a ratchet binder receiver 294 affixed to a vertical arm of the transfer base 296. A clevis bolt 278 provides the pivoted connection.

A ratchet 284 and a ratchet handle 286 are connected to a ratchet barrel 288. The barrel 288 receives the threaded rods 280 on either side of the ratchet binder 266. By manually activating the ratchet handle 286, the threaded rods 280 are extended or retracted. Retracting the threaded rods 280 tightens the connection between the transport base 104 and the container packer 106, ensuring that the container packer 106 does not move unless it is in operation, at which time the ratchet binder 266 is disconnected.

Figure 23:
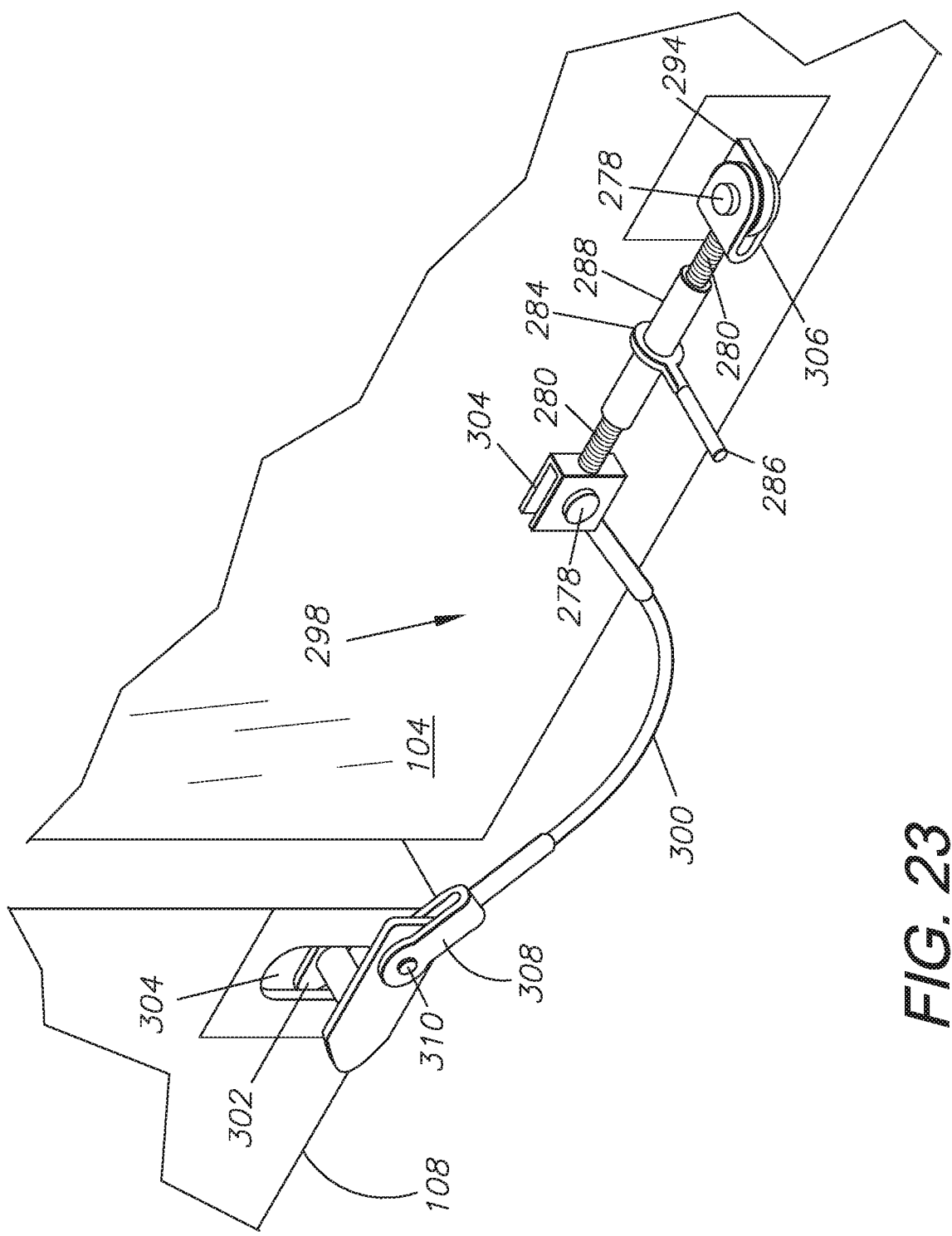
FIG. 23 is an upper, front perspective of the binder used to connect the transfer base to the transport container.

FIG. 23 shows a method of linking the transport container 108 to the transfer base 104, ensuring the two elements remain in close proximity during the loading process as shown more clearly in FIG. 13. A connecting hinge 306 is included which connects a ratchet binder 298 to the ratchet binder receiver 294 affixed to the transfer base 104 using a clevis bolt 278. A separate fastener 304 including a clevis bolt 278 is affixed to a retainer cord 300. The end of the retainer cord 300 includes a connecting tab 308 which is affixed to a fastener 302 with an additional clevis bolt 310. The transport container 108 includes a fastener receiver 304 for receiving the fastener 302 when the container 108 and the transfer base 104 are in close proximity. The fastener 302 can be rotated vertically and removed when the operation is over.

FIG. 24 shows a third-stage carrier 334 for the hydraulic piston and cylinder 130 of the container packer 106. The carrier 334 ensures that the piston and cylinder does not sag during operation, and is particularly applicable to a longer loading system 102. The carrier 334 includes a cross frame member 336, a pair of vertical frame members 338a,b and a pair of carrier rollers 344a,b. A carrier connection box 342 is affixed to the center of the frame members 336 and 338a,b, and includes a catch piece 340 for receiving a portion of the piston and cylinder unit 130. The catch piece 340 may be temporarily or permanently affixed to the piston and cylinder unit 130, but must remain in place throughout the loading operation. The carrier rollers 344a,b allow the carrier 334 to travel with the container packer 106 during a loading operation.

Figure 25:
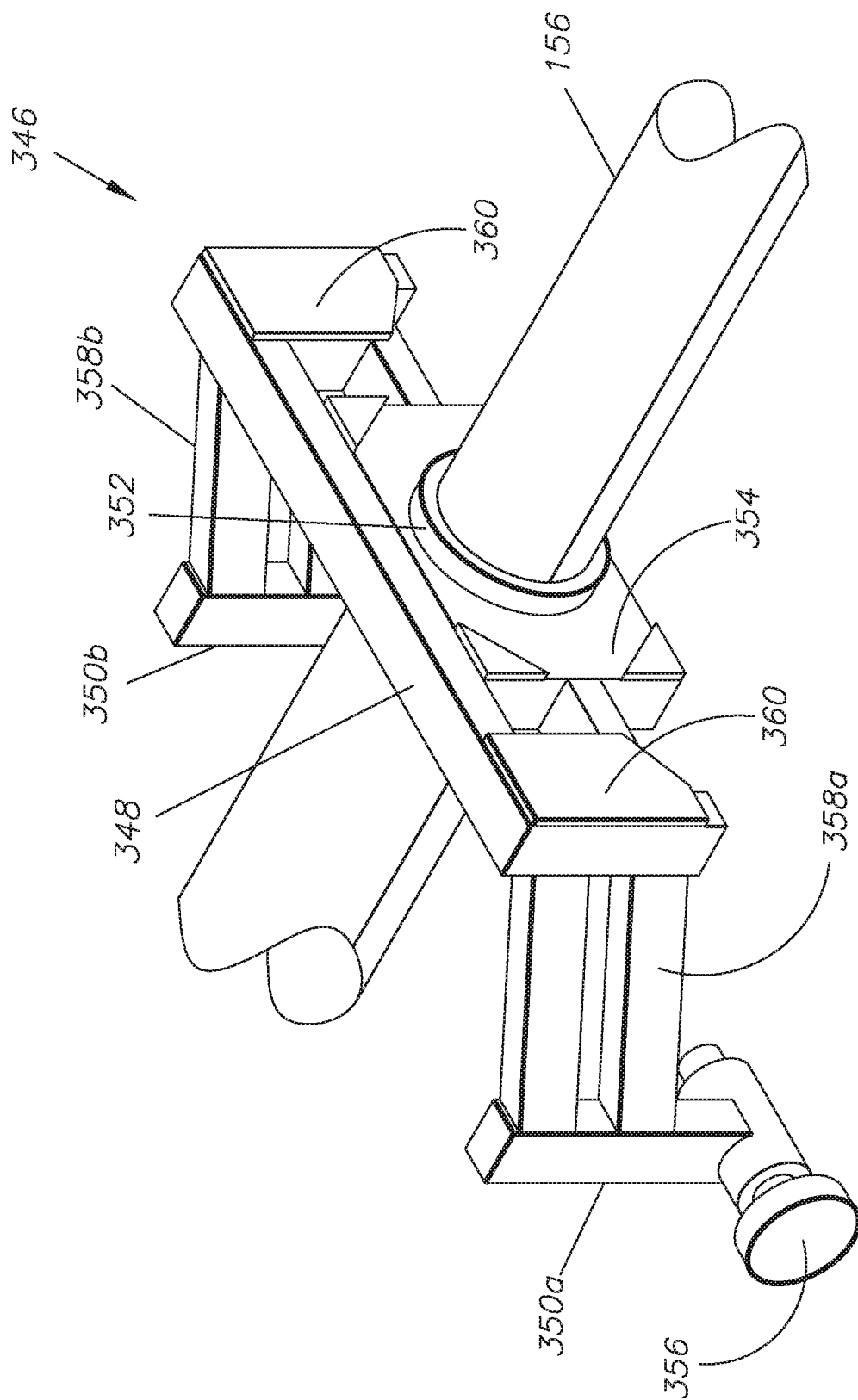
FIG. 25 is an upper front perspective of the third stage carrier on the push blade assembly piston-and-cylinder.

FIG. 25 demonstrates an embodiment of a third-stage carrier 346 for the hydraulic piston-and-cylinder unit 156 of the push blade assembly 150. The carrier 346 functions like the third-stage carrier 334 connected to the container packer piston and cylinder unit 130. The carrier 346 includes a cross frame member 348, and a pair of vertical frame members 350a,b connected to a front plate 360 via a pair of carrier arms 358a,b. A pair of carrier rollers 356 are affixed to the base of the vertical frame members 350a,b. A carrier connection box 354 is affixed to the center of the carrier 346 and includes a connection piece 352 for receiving a portion of the piston and cylinder unit 156. The catch piece 352 may be temporarily or permanently affixed to the piston and cylinder unit 156, but should remain in place throughout the loading operation. The carrier rollers 356 allow the carrier 346 to travel with the container packer 150 during a loading operation.

Figure 26:
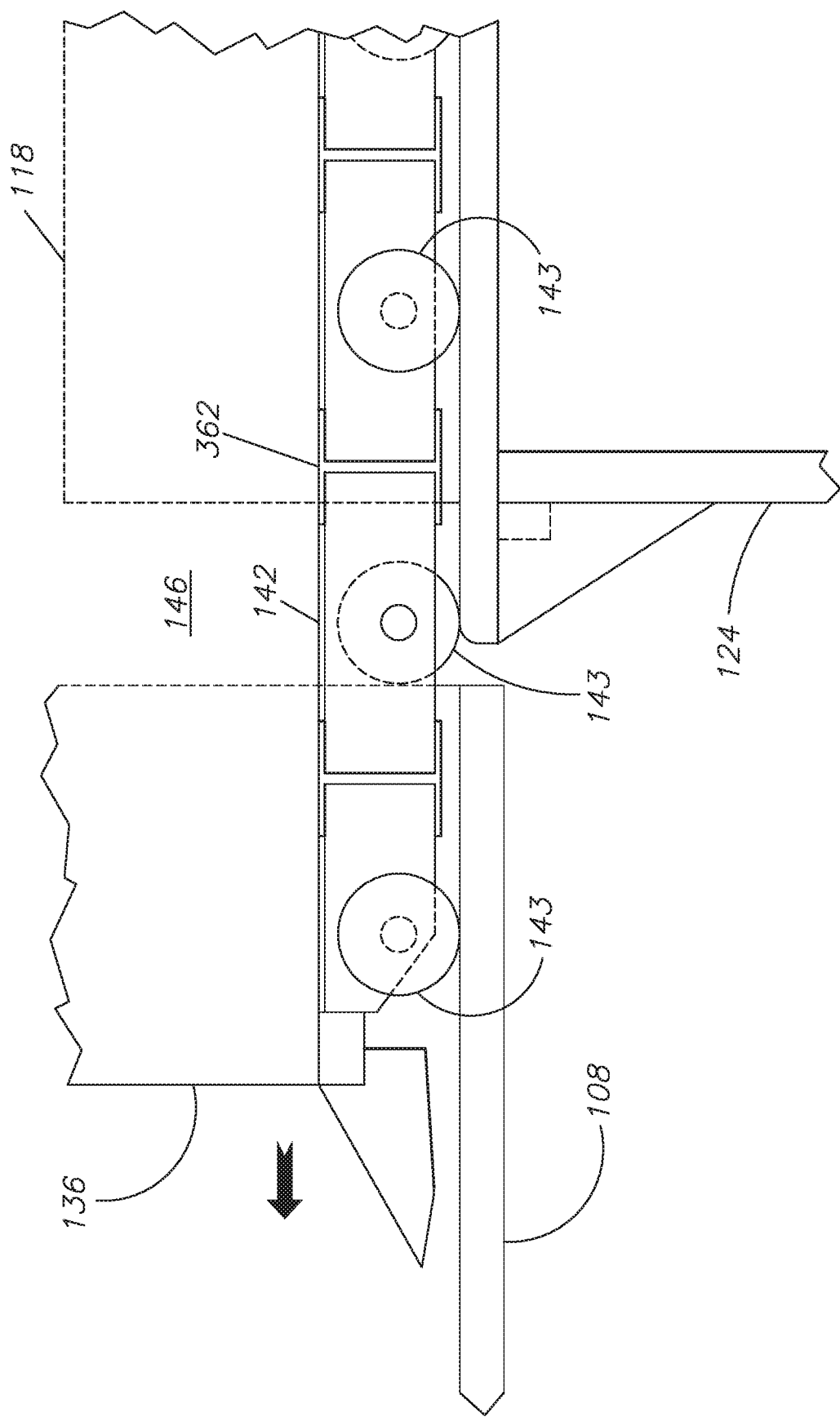
FIG. 26 is a cross-sectional view of the container packer extending into the transport container.

FIG. 26 is a cross sectional view of the container packer 106 extended into the transport container 108. The rollers 143 in the floor 142 of the container packer 106 are engaged with both the transfer base 104 and the transport container 108 as the container packer 106 extends into the transport container 108. The cross section shows the structural cross beams 362 of the container packer 106 between the rollers 143. The container packer rollers 143 roll along the surface of the transport base 104 and directly contact the inside floor of the transport container 108. There is no need for tracks or any additional guiding elements within the transport container—the rollers allow the container packer 106 to be inserted into any standard transport container.

It will be appreciated that various steps of the procedure described above, and additional steps, can be automated with a programmable microprocessor. For example, leveling the transfer base 104, inserting the container packer 106 and operating the push blade assembly 150 can all be automated. Moreover, hydraulic controls utilizing a multi-position valve(s) can be provided for an operator to control the functions of the system 102. Such a valve(s) can also be automated.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A system, comprising:
   a transfer base including proximate and distal ends and a container packer guide;
   a container packer including a proximate end, a distal end defining an opening, opposite sidewalls, and a floor;
   said container packer being movable longitudinally along said container packer guide;
   a container packer drive configured for moving said container packer longitudinally along said container packer guide;
   said container packer drive comprising a container packer piston-and-cylinder unit attached to said transfer base and said container packer at fixed locations;
   a material transfer assembly in said container packer and configured for discharging bulk material;
   a material transfer assembly drive connected to said material transfer assembly and configured for operating said material transfer assembly;
   said material transfer assembly comprising a push blade assembly located in said container packer and movable longitudinally;
   said push blade assembly including a push blade extending transversely across said container packer; and
   said push blade assembly being configured for extending and retracting, whereby said push blade assembly is configured for removing said bulk material from said container packer.

2. The system according to claim 1, wherein said material transfer assembly drive comprises a push blade assembly piston-and-cylinder unit configured for pushing said push blade assembly towards the opening at the distal end of the container packer.

3. The system according to claim 2, wherein said container packer comprises a pair of guide rails, each guide rail extending horizontally along one of the sidewalls inside said container packer.

4. The system according to claim 3, wherein said push blade assembly comprises rollers for engaging said guide rails to guide movement of the push blade assembly longitudinally.

5. The system of claim 4, further comprising a programmable microprocessor operatively connected to said container packer drive and said material transfer assembly drive to automate movement of said container packer and said material transfer assembly to discharge bulk material out of the container packer.

6. The system according to claim 5, further comprising a hydraulic power source on said transfer base and connected to said container packer piston-and-cylinder unit.

7. The system of claim 1, further comprising a programmable microprocessor operatively connected to said container packer drive and said material transfer assembly drive to automate movement of said container packer and said material transfer assembly to discharge bulk material out of the container packer.

8. A system, comprising:
   a transfer base;
   a container packer including opposite sidewalls, and a floor;
   said container packer being movable longitudinally with respect to said transfer base;
   a container packer drive configured for moving said container packer longitudinally along said transfer base;
   a push blade in said container packer and movable longitudinally with respect to said container packer;
   a push blade piston-and-cylinder unit connected to said push blade and configured for moving said push blade longitudinally with respect to said container packer;
   said push blade extending transversely across said container packer; and
   said container packer having a pair of guide rails, each guide rail extending horizontally along one of said sidewalls inside said container packer for engaging said push blade and guiding movement of the push blade longitudinally with respect to the container packer.

9. The system according to claim 8, wherein said push blade is mounted on a framework with rollers for engaging said guide rails to guide movement of the push blade longitudinally with respect to the container packer.

10. The system according to claim 9, wherein the container packer comprises a front end, and a back end, and wherein the back end defines a back opening.

11. The system of claim 10, wherein said container packer drive comprises a container packer piston-and-cylinder unit, and is attached to said transfer base and said container packer.

12. The system according to claim 11, further comprising a hydraulic power source on said transfer base and connected to said container packer piston-and-cylinder unit.

13. The system of claim 12, further comprising a programmable microprocessor operatively connected to said container packer drive and said push blade piston-and-cylinder unit to automate movement of said container packer and said push blade to discharge bulk material out of said back opening of said container packer.

14. The system of claim 8, further comprising a programmable microprocessor operatively connected to said container packer drive and said push blade piston-and-cylinder unit to automate movement of said container packer and said push blade to discharge bulk material out of said container packer.

15. The system according to claim 8, wherein the container packer comprises a front end, and a back end, and wherein the back end defines a back opening.

16. The system of claim 15, wherein said container packer drive comprises a container packer piston-and-cylinder unit, and is attached to said transfer base and said container packer.

17. The system according to claim 16, further comprising a hydraulic power source on said transfer base and connected to said container packer piston-and-cylinder unit.

18. The system of claim 17, further comprising a programmable microprocessor operatively connected to said container packer drive and said push blade piston-and-cylinder unit to automate movement of said container packer and said push blade to discharge bulk material out of said back opening of said container packer.

19. A system for packing bulk material in a container, which system comprises:
- a transfer base including proximate and distal ends and a container packer guide, said transfer base including a transfer base floor;
- a container packer including a proximate end, a distal end with an opening, opposite sidewalls, a floor, and an interior, said container packer being movable longitudinally along said container packer guide between a retracted position on said transfer base and an extended position extending at least partially from said transfer base distal end;
- a container packer drive connected to said transfer base and said container packer and adapted for moving said container packer between its extended and retracted positions;
- a material transfer assembly mounted in said container packer interior and adapted for discharging bulk material through said container packer distal end opening;
- a material transfer assembly drive connected to said material transfer assembly and adapted for operating said material transfer assembly;
- said material transfer assembly comprising a push blade assembly located in and affixed to said container packer and movable longitudinally between a retracted position in proximity to said container packer proximate end and an extended position in proximity to said container packer distal end;
- said push blade assembly including a push blade extending transversely across said container packer interior, and adapted for compressing bulk material in said transport container;
- said container packer drive comprising a container packer piston-and-cylinder unit connected to said transfer base proximate end and said container packer proximate end;
- a hydraulic power source mounted on said transfer base and connected to said container packer piston-and-cylinder unit;
- said material transfer assembly drive comprising a push blade assembly piston-and-cylinder unit connected to said hydraulic power source and adapted for extending and retracting said push blade assembly between an extended position distally beyond said transfer base distal end and a retracted position adjacent to said container packer proximate end within said container packer interior, said push blade assembly movement sequentially cooperating with said container packer movement whereby said push blade assembly is adapted for compacting bulk material in said container; wherein said container packer drive piston-and-cylinder unit is attached at a position relative to the base of said container packer, and said push blade assembly piston-and-cylinder unit is attached at the approximate center of said push blade assembly;
- said material transfer assembly, including said material transfer assembly drive and push blade assembly, being adapted for sequentially filling said transport container with multiple container packer loads against said transport container distal end; and
- said push blade assembly further including a generally vertical blade mounted on said framework and extending generally transversely across said container packer interior;
- said container packer having a pair of guide rails each mounted on and extending horizontally along a respective sidewall inside said enclosure; said push blade assembly including a framework with rollers rollingly engaging said guide rails; and
- said push blade assembly further including a generally vertical blade mounted on said framework and extending generally transversely across said container packer interior.

* * * * *